(12) United States Patent
Yamaguchi et al.

(10) Patent No.: US 10,884,254 B2
(45) Date of Patent: Jan. 5, 2021

(54) IMAGE DISPLAY DEVICE HAVING OCULAR OPTICAL SYSTEM CAUSING IMAGES TO OVERLAP IN A BLENDING AREA

(71) Applicant: SEIKO EPSON CORPORATION, Tokyo (JP)

(72) Inventors: Tokito Yamaguchi, Azumino (JP); Masayuki Takagi, Azumino (JP); Toshiaki Miyao, Matsumoto (JP); Akira Komatsu, Tatsuno-machi (JP); Takashi Takeda, Suwa (JP)

(73) Assignee: SEIKO EPSON CORPORATION, Tokyo (JP)

( * ) Notice: Subject to any disclaimer, the term of this patent is extended or adjusted under 35 U.S.C. 154(b) by 176 days.

(21) Appl. No.: 16/162,796

(22) Filed: Oct. 17, 2018

(65) Prior Publication Data

US 2019/0113764 A1   Apr. 18, 2019

(30) Foreign Application Priority Data

Oct. 18, 2017  (JP) ................. 2017-201615

(51) Int. Cl.
*G02B 27/10* (2006.01)
*G02B 27/01* (2006.01)

(52) U.S. Cl.
CPC ..... *G02B 27/1066* (2013.01); *G02B 27/0149* (2013.01); *G02B 27/0172* (2013.01); *G02B 2027/015* (2013.01); *G02B 2027/0123* (2013.01)

(58) Field of Classification Search
CPC .............. G02B 27/017; G02B 27/0172; G02B 27/0176; G02B 27/1066; G02B 2027/0123

USPC .................................................. 359/618, 630
See application file for complete search history.

(56) References Cited

U.S. PATENT DOCUMENTS

| 5,844,713 A | 12/1998 | Nanba et al. | |
| 5,982,343 A * | 11/1999 | Iba | G02B 27/0172 345/8 |
| 7,616,382 B2 * | 11/2009 | Inoguchi | G02B 27/1066 345/9 |
| 8,982,472 B2 * | 3/2015 | Lvovskiy | G02B 27/30 345/7 |
| 8,994,614 B2 * | 3/2015 | Bickerstaff | G02B 27/0172 345/8 |

(Continued)

FOREIGN PATENT DOCUMENTS

| JP | H8-240786 A | 9/1996 |
| JP | 2002-311502 A | 10/2002 |

(Continued)

*Primary Examiner* — Zachary W Wilkes
(74) *Attorney, Agent, or Firm* — Oliff PLC

(57) ABSTRACT

An image display device includes a plurality of display elements configured to emit image light corresponding to a plurality of separate areas, and an ocular optical system configured to emit, to a position corresponding to an eye of an observer, the image light emitted from the plurality of display elements. The ocular optical system causes images to overlap with each other in a blending area including a boundary between the plurality of areas. An overlapping angle width in a direction orthogonal to the boundary of the blending area on a central visual field side is smaller than an overlapping angle width in the direction orthogonal to the boundary of the blending area on a peripheral visual field side.

12 Claims, 21 Drawing Sheets

(56) References Cited

U.S. PATENT DOCUMENTS

| | | | |
|---|---|---|---|
| 9,291,821 B1* | 3/2016 | Lvovskiy | G02B 27/01 |
| 9,746,673 B2* | 8/2017 | Schreiber | G02B 27/0172 |
| 10,607,323 B2* | 3/2020 | Han | G06T 5/006 |
| 2008/0225186 A1 | 9/2008 | Miyazawa et al. | |
| 2008/0316606 A1 | 12/2008 | Inoguchi et al. | |
| 2010/0109980 A1* | 5/2010 | Tohara | G02B 27/0172 345/32 |
| 2010/0290124 A1* | 11/2010 | Tohara | G02B 27/0172 359/630 |
| 2012/0127381 A1* | 5/2012 | Lvovskiy | G02B 27/0101 349/11 |
| 2020/0026084 A1* | 1/2020 | Kwon | G02F 1/133305 |

FOREIGN PATENT DOCUMENTS

| | | |
|---|---|---|
| JP | 2004-228824 A | 8/2004 |
| JP | 2008-225297 A | 9/2008 |
| JP | 2009-3128 A | 1/2009 |

\* cited by examiner

IMAGE DISPLAY DEVICE HAVING OCULAR OPTICAL SYSTEM CAUSING IMAGES TO OVERLAP IN A BLENDING AREA

BACKGROUND

1. Technical Field

The invention relates to an image display device configured to present an image to an observer, and particularly relates to an image display device including an ocular optical system configured to emit, to an observer's eye, image light emitted from a plurality of display elements.

2. Related Art

There is known a head-mounted display (also called "HMD" hereinafter) including a plurality of image display means configured to display display images different from each other, and an observation optical system configured to reflect a light flux emitted from each display image by a combination reflection surface provided for each of the image display means, and to guide the light flux emitted from each of a plurality of the reflection surfaces to an observer through a single optical system (JP-A-08-240786, JP-A-2009-3128). JP-A-2009-3128 in particular also discloses combination display of original images partially overlapping with each other.

However, with the above-described HMD, a boundary between a plurality of virtual images may be visible clearly at a seam of separate image regions. Furthermore, when the overlap of the image regions increases, a viewing angle of the optical system increases to achieve the viewing angle intended by design (and thus, a size of the optical system increases), and a reduction in a size of the optical system is hindered. Furthermore, in the above-described case, a further increase in the viewing angle of the optical system is also hindered.

SUMMARY

An advantage of some aspect of the invention is to provide an image display device capable of achieving an increase in a viewing angle and a size reduction and also capable of preventing a boundary from being noticeable at a seam between separate image regions.

An image display device according to an aspect of the invention includes a plurality of display elements configured to emit image light corresponding to a plurality of separate areas, and an ocular optical system configured to emit, to a position corresponding to an eye of an observer, the image light emitted from the plurality of display elements. The ocular optical system causes images to overlap with each other in a blending area including a boundary between the plurality of areas. An overlapping angle width in a direction orthogonal to the boundary of the blending area on a central visual field side is smaller than an overlapping angle width in the direction orthogonal to the boundary of the blending area on a peripheral visual field side.

In the above-described ocular optical system, since the overlapping angle width in the direction orthogonal to the boundary of the blending area on the central visual field side is smaller than the overlapping angle width in the direction orthogonal to the boundary of the blending area on the peripheral visual field side, a seam between images on the central visual field side can be made less noticeable, and a seam between images on the peripheral visual field side can be narrowed to reduce overlap between optical systems. Accordingly, a boundary can be prevented from being noticeable at a seam between separate image regions, and an increase in a viewing angle and a size reduction can also be achieved.

According to a specific aspect of the invention, the blending area includes a blending area on the central visual field side and a blending area on the peripheral visual field side, and an overlapping angle width of the blending area on the central visual field side is larger than an overlapping angle width of the blending area on the peripheral visual field side.

According to another aspect of the invention, the ocular optical system includes a plurality of optical system parts. In other words, image light is formed by the plurality of optical system parts, and images are caused to overlap with each other in the blending area extending into the adjacent blending area.

According to yet another aspect of the invention, an angle of an optical axis of each of the plurality of optical system parts relative to a visual axis as looking forward is smaller than half a half viewing angle by design of the ocular optical system.

According to still another aspect of the invention, an angle $\theta$ in a prescribed direction relative to the visual axis of the optical axis of each of the plurality of optical system parts is in the range given by Relationship (1) below, where $\alpha$ represents a viewing angle in the prescribed direction of each of the optical system parts constituting the ocular optical system:

$$0 < \{(\alpha/2 - \theta)/\alpha\} < 0.4 \tag{1}$$

According to still another aspect of the invention, the blending area extends linearly along the boundary between the plurality of areas.

According to still another aspect of the invention, the blending area is disposed at a position shifted from the visual axis as looking forward.

According to still another aspect of the invention, the plurality of areas are aligned in a lateral direction along which eyes are arranged, and are aligned in a vertical direction orthogonal to the lateral direction along which the eyes are arranged.

According to still another aspect of the invention, an overlapping angle width in the lateral direction of a blending area extending in the vertical direction is smaller than an overlapping angle width in the vertical direction of a blending area extending in the lateral direction.

According to still another aspect of the invention, the image display device further includes a control circuit unit configured to carry out correction processing reflecting image forming properties of the ocular optical system on display in the blending area by the plurality of display elements. In this case, a boundary can be prevented by signal processing from being noticeable at a seam between separate image regions.

According to still another aspect of the invention, the control circuit unit receives setting from a user for the correction processing on the display in the blending area. In this case, adjustment reflecting a user's preference can be made.

According to still another aspect of the invention, the display elements include any of an organic EL display device, a liquid-crystal display device, and a laser scanning display device.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Exemplary Embodiment

An image display device of First Exemplary Embodiment according to the invention will be described hereinafter with reference to the drawings. Note that FIG. 1 and the like each illustrate three axes X, Y, and Z of an orthogonal coordinate system, where Y corresponds to a lateral direction or a horizontal direction in which a pair of eyes of an upright observer are arranged, and Z corresponds to a vertical direction perpendicular to the lateral direction in which the eyes are arranged or a visual axis in a forward line of sight.

Figure 1:
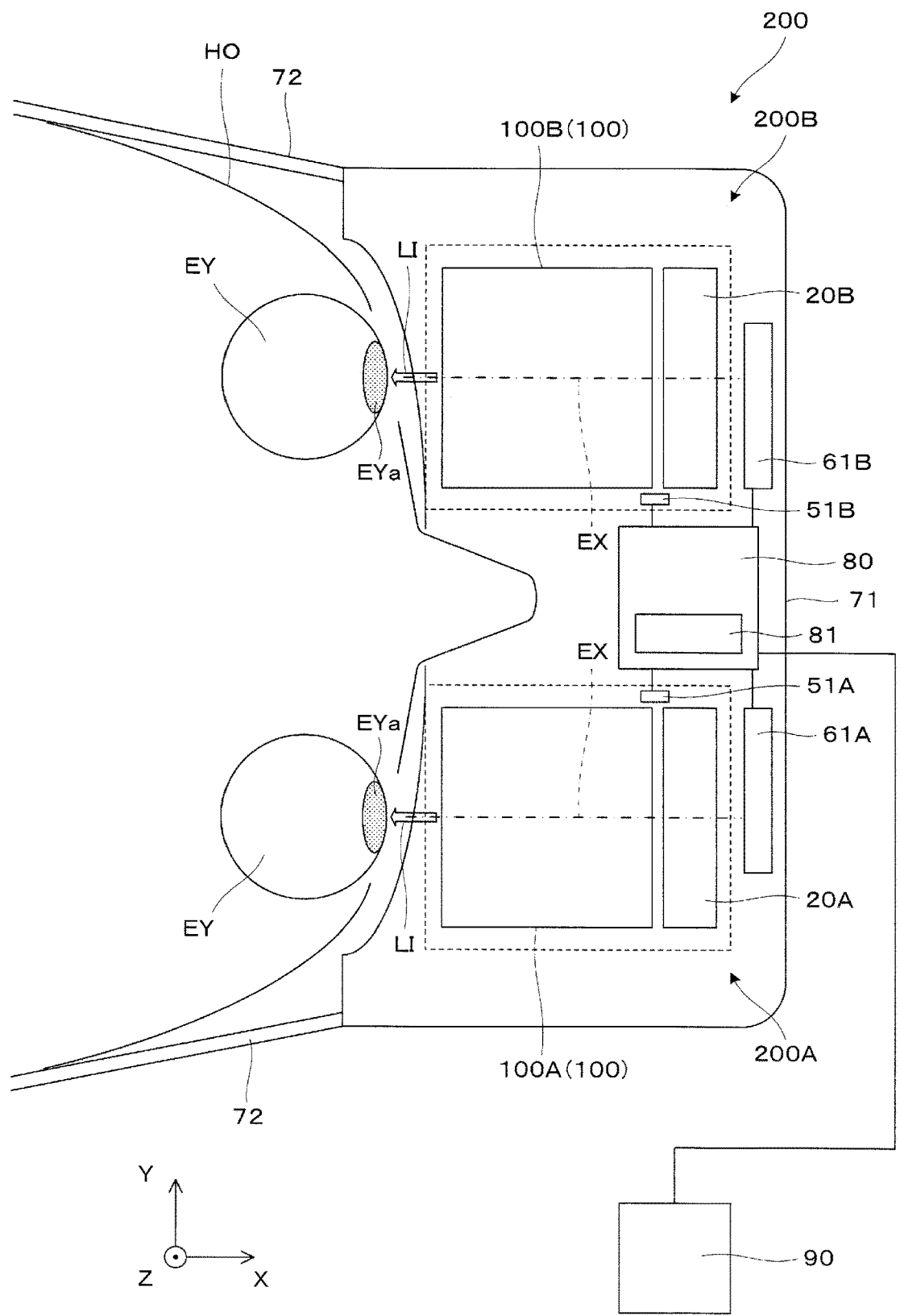
FIG. 1 is an explanatory conceptual plan view illustrating an image display device according to First Exemplary Embodiment.

An image display device 200 illustrated in FIG. 1 is an eyeglass-type head-mounted display, and includes a pair of image display units 200A and 200B on left and right sides, a control circuit unit 80 configured to control display operations and the like of the image display units 200A and 200B, and an operation control unit 90 configured to receive user operations and to operate in coordination with the control circuit unit 80. The image display device 200 causes combined light LI forming a virtual image to enter positions of both of eyes EY of an observer HO that is a user or wearer, and thus, the observer HO recognizes various types of images such as a moving image and a still image. The image display units 200A and 200B are supported in a casing 71 serving as a common holding unit. The casing 71 maintains a mutual positional relationship between the image display units 200A and 200B, and maintains relative positional relationships between a plurality of optical components constituting each of the image display units 200A and 200B. A band 72 removably fixes the casing 71 to a head of the observer HO.

The image display unit 200A on the right side includes an ocular optical system 100A, a display section 20A, and a display drive circuit 61A. The image display unit 200B on the left side includes an ocular optical system 100B, a display section 20B, and a display drive circuit 61B. Monitor units 51A and 51B are provided accompanying the ocular optical systems 100A and 100B, respectively, to check brightness and chromaticity of virtual images formed by the ocular optical systems 100A and 100B, respectively.

The ocular optical system 100B, the display section 20B, and the display drive circuit 61B constituting the image display unit 200B on the left side include the same structures as the structures of the ocular optical system 100A, the display section 20A, and the display drive circuit 61A constituting the image display unit 200A on the right side. Thus, the following will mainly describe the image display unit 200A on the right side, without describing the image display unit 200B on the left side. Note that a virtual image formed by the image display unit 200B on the left side may not be the same as a virtual image formed by the image display unit 200A on the right side, and for example, the image display unit 200B on the left side and the image display unit 200A on the right side can form images having disparity between the left and right sides.

Figure 2:
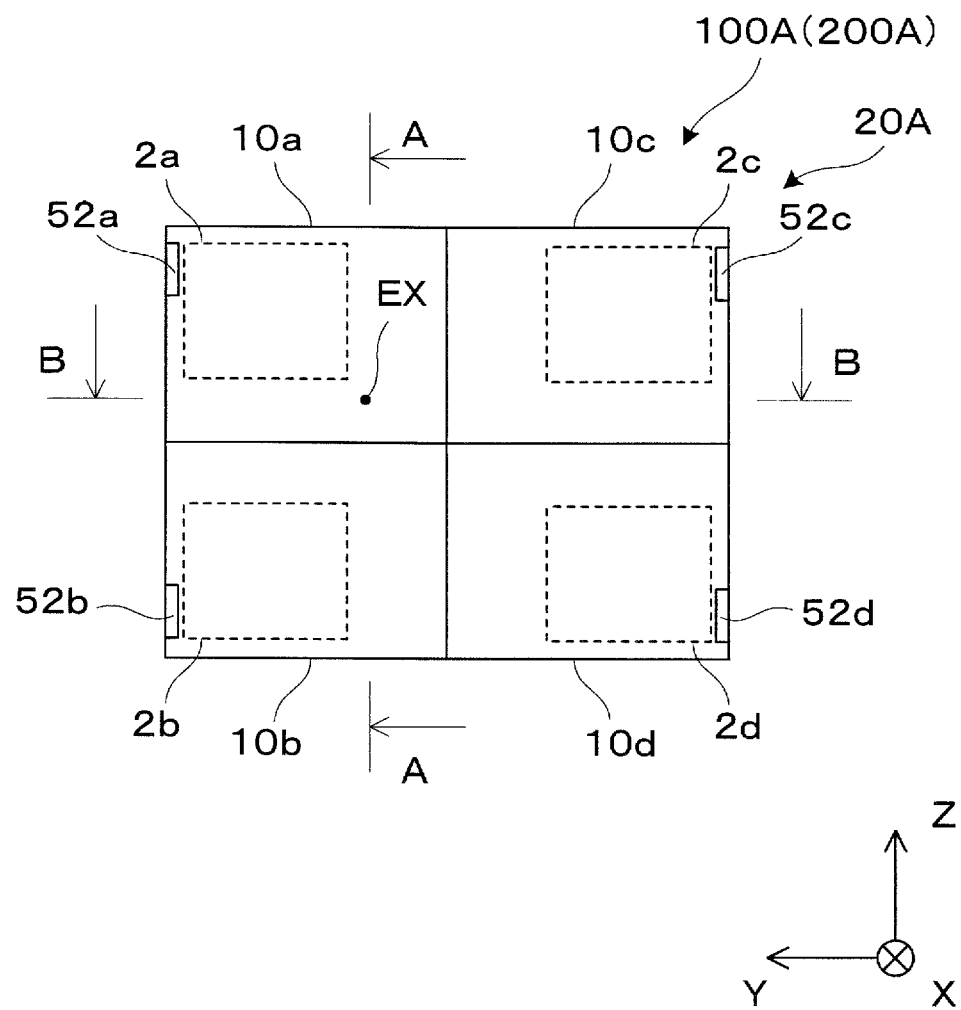
FIG. 2 is a conceptual diagram illustrating one of image display units of the image display device as seen from an eye side.

As illustrated conceptually in FIG. 2, the ocular optical system 100A of the image display unit 200A on the right side includes first to fourth optical system parts 10a to 10d, and the display section 20A includes first to fourth display elements 2a to 2d. The first to fourth optical system parts 10a to 10d and the first to fourth display elements 2a to 2d are disposed in positions offset or shifted downward, rightward, and the like from the center as a reference through which a visual axis EX of an eye EY on the right side passes when the eye EY is looking forward. In other words, the visual axis EX as looking forward passes through the first optical system part 10a. As a result, a visual field adapted to characteristics of the right eye can be ensured, and boundaries of displays made by the first to fourth optical system parts 10a to 10d can be removed from a central visual field described below. In this case, the first optical system part 10a configured to form an image corresponding to the central visual field may have resolution comparatively higher than resolution of each of the second to fourth optical system parts 10b to 10d.

Monitor devices 52a to 52d are provided accompanying the optical system parts 10a to 10d, respectively. The monitor devices 52a to 52d constitute the monitor unit 51A of FIG. 1. The monitor devices 52a to 52d individually detect and output, to the control circuit unit 80 of FIG. 1, brightness and chromaticity of the virtual images formed by the optical system parts 10a to 10d.

Figure 3:
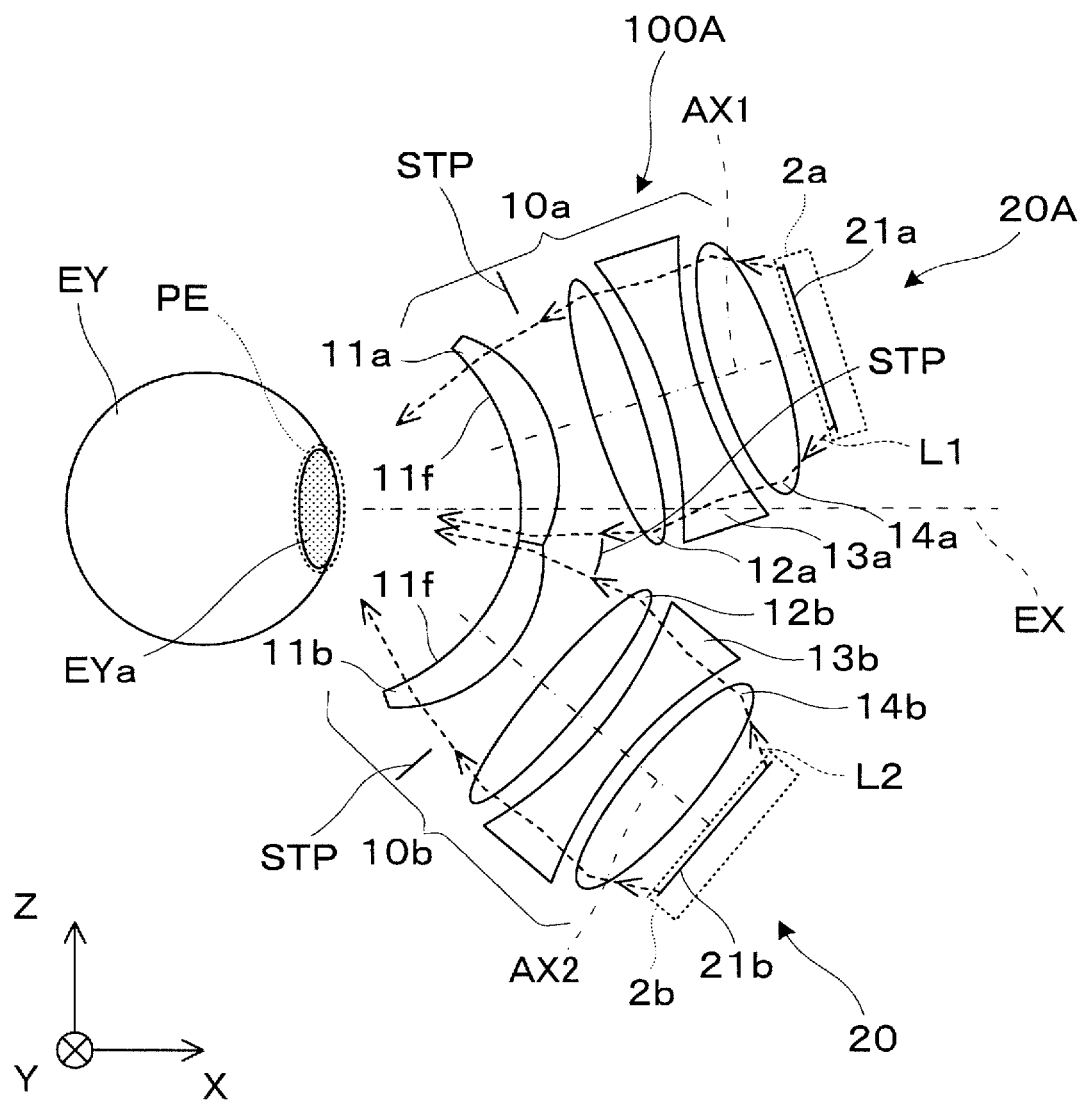
FIG. 3 is an explanatory cross-sectional view illustrating an ocular optical system as a cross-section from AA arrows in FIG. 2.
Figure 5A:
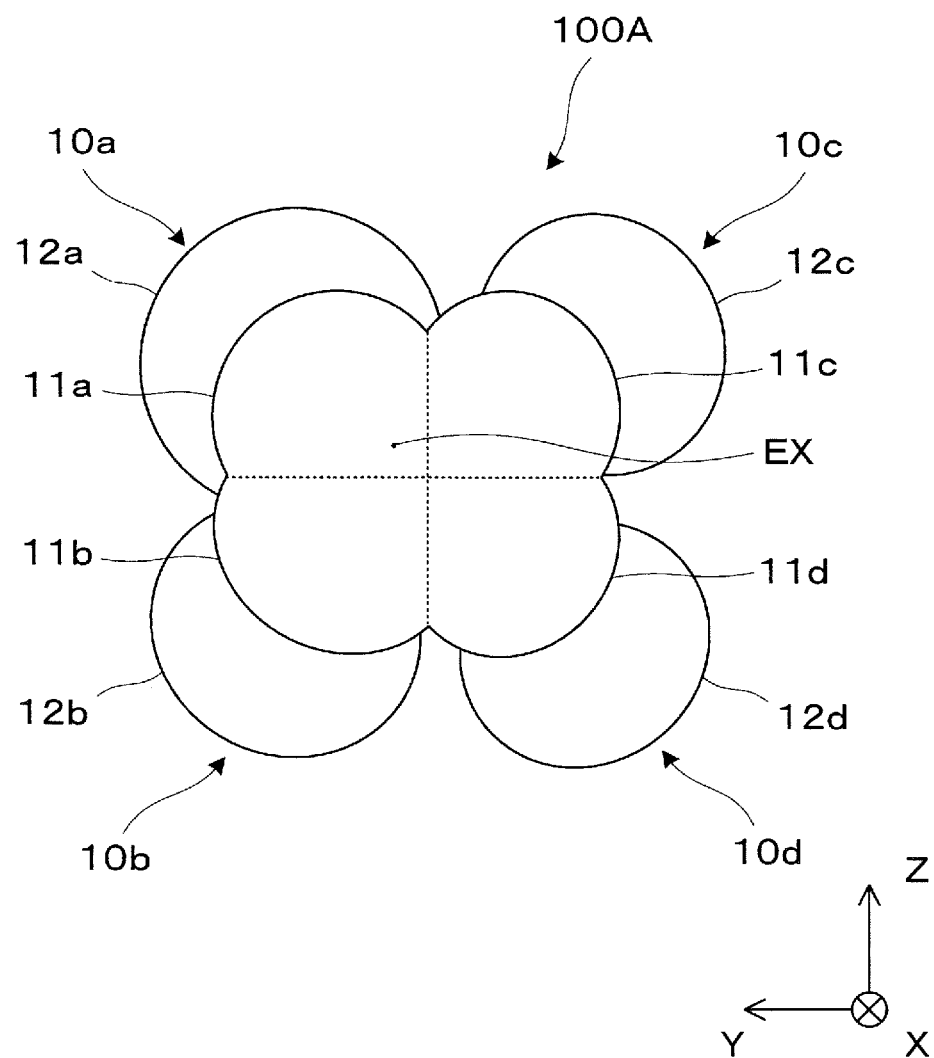
FIG. 5A is a conceptual diagram illustrating an ocular optical system as seen from an eye side.

As illustrated in FIGS. 3 and 5A, the first optical system part 10a of the ocular optical system 100A is disposed to cover a central area through which the visual axis EX of the eye EY passes when the eye EY is looking forward, and to cover an area above the central area. The second optical system part 10b is disposed to cover an area below the central area through which the visual axis EX of the eye EY passes when the eye EY is looking forward. In other words, the first optical system part 10a mainly handles an image corresponding to an upper area of a visual field horizontally divided at a position slightly below the visual axis EX, and the second optical system part 10b mainly handles an image corresponding to a lower area of the visual field horizontally divided.

The first optical system part 10a is constituted by a plurality of lenses. Specifically, the first optical system part 10a includes an exit lens 11a, intermediate lenses 12a and 13a, and an entry lens 14a, in order from an exit side closer to a position PE where a pupil EYa of the eye EY is disposed. Furthermore, the second optical system part 10b includes a plurality of lenses. Specifically, the second optical system part 10b includes an exit lens 11b, intermediate lenses 12b and 13b, and an entry lens 14b, in order from an exit side closer to the position PE corresponding to the pupil EYa.

While the exit lens 11a of the first optical system part 10a and the exit lens 11b of the second optical system part 10b are separate lenses, the exit lenses 11a and 11b can also be a single entity. Exit-side surfaces 11f of the exit lenses 11a and 11b are continuous recessed curved surfaces, and a curvature radius of each exit-side surface 11f or an approximate spherical surface of each exit-side surface 11f is equal to a distance by design from the position PE of the pupil EYa to each exit-side surface 11f. In other words, each exit-side surface 11f is set to a curvature corresponding to an eye relief length.

The exit lens 11a, the intermediate lenses 12a and 13a, and the entry lens 14a constituting the first optical system part 10a can each be any of a spherical lens, an aspherical lens, and a freeform surface lens, and the like. Furthermore, the intermediate lenses 12a and 13a are not limited to be two lenses, and can be a single lens, or three or more lenses. The exit lens 11b, the intermediate lenses 12b and 13b, and the entry lens 14b constituting the second optical system part 10b can each be any of a spherical lens, an aspherical lens, a freeform surface lens, and the like. Furthermore, the intermediate lenses 12b and 13b are not limited to be two lenses, and can be a single lens, or three or more lenses.

A stop STP can be disposed on a light entry side of a pair of the exit lenses 11a and 11b. The stop STP can prevent unnecessary light from entering the position PE of the pupil EYa and forming a ghost image. The same type of stop can also be disposed near the intermediate lenses 12a, 13a, 12b, and 13b, the entry lenses 14a and 14b, and the like.

The exit lens 11a, the intermediate lenses 12a and 13a, and the entry lens 14a constituting the first optical system part 10a can be formed from a plastic material, or a glass material. Similarly, the exit lens 11b, the intermediate lenses 12b and 13b, and the entry lens 14b constituting the second optical system part 10b can be formed from a plastic material, or a glass material.

The above-described first and second optical system parts 10a and 10b guide images formed on display surfaces 21a and 21b of the first and second display elements 2a and 2b to the position PE of the pupil EYa, and a virtual image is formed at infinity or a position corresponding to infinity on the front-left side as looking from the position PE.

Figure 4:
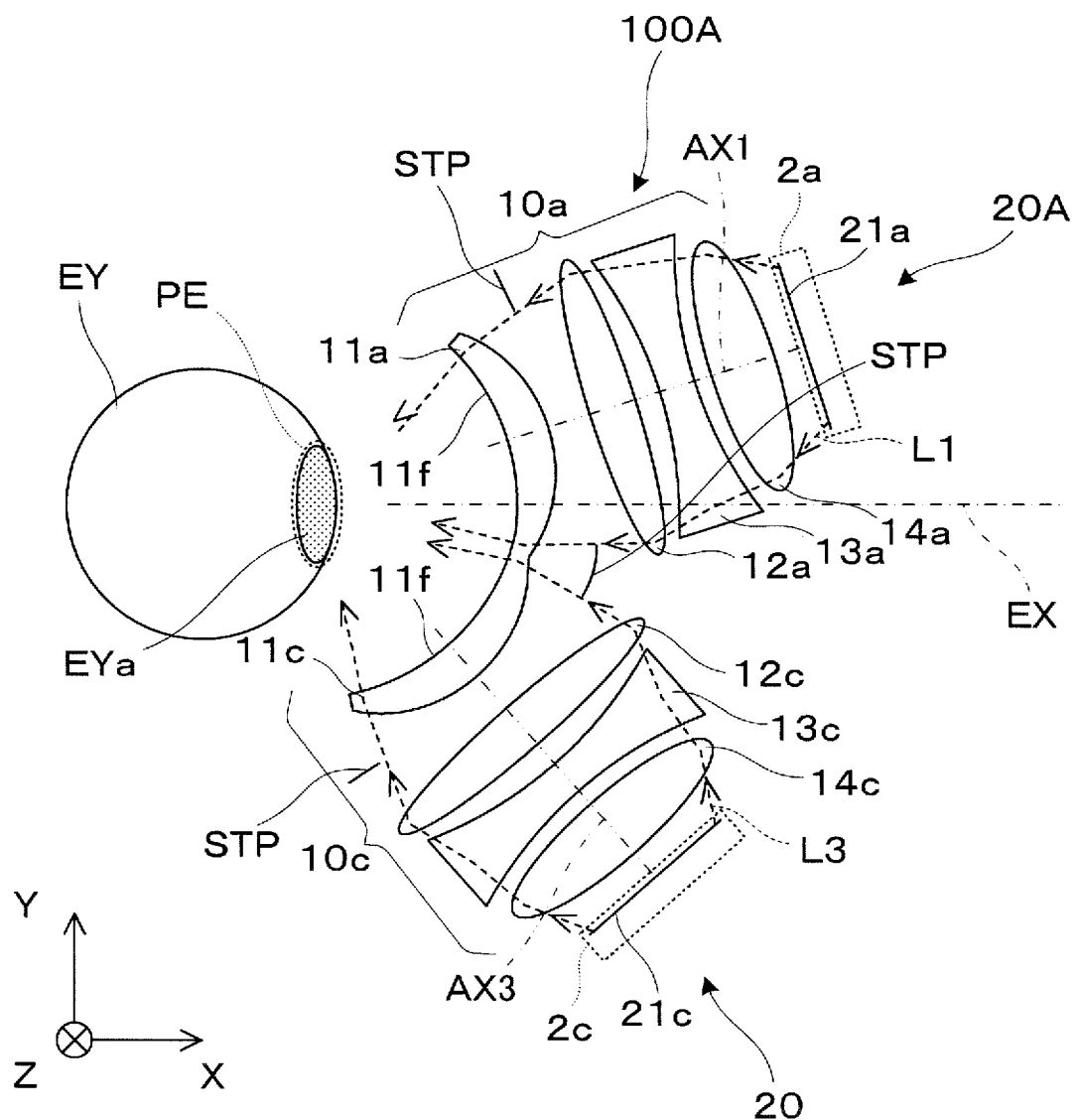
FIG. 4 is an explanatory cross-sectional view illustrating an ocular optical system as a cross-section from BB arrows in FIG. 2.

As illustrated in FIGS. 4 and 5A, the first optical system part 10a of the ocular optical system 100A is disposed to cover a central area through which the visual axis EX of the eye EY passes when the eye EY is looking forward, and to cover an area on the left side or on the inner side of the central area. The third optical system part 10c is disposed to cover an area on the right side or on the outer side of the central area through which the visual axis EX of the eye EY passes when the eye EY is looking forward. In other words, the first optical system part 10a mainly handles an image corresponding to the left side of a visual field vertically divided at a position located slightly on the right side of the visual axis EX, and the third optical system part 10c mainly handles an image corresponding to the right side of the visual field vertically divided.

The third optical system part 10c includes a plurality of lenses. Specifically, the third optical system part 10c includes an exit lens 11c, intermediate lenses 12c and 13c, and an entry lens 14c, in order from an exit side closer to the position PE corresponding to the pupil EYa. While the exit lens 11a of the first optical system part 10a and the exit lens 11c of the third optical system part 10c are separate lenses, the exit lenses 11a and 11c can also be a single entity. A curvature radius of the exit-side surface 11f of each of the exit lenses 11a and 11c, or of an approximate spherical surface of the exit-side surface 11f is equal to a distance by design from the position PE of the pupil EYa to the exit-side surface 11f.

The exit lens 11c, the intermediate lenses 12c and 13c, and the entry lens 14c constituting the third optical system part 10c can each be any of a spherical lens, an aspherical lens, a freeform surface lens, and the like. Furthermore, the intermediate lenses 12c and 13c are not limited to be two lenses, and can be a single lens, or three or more lenses. The exit lens 11c, the intermediate lenses 12c and 13c, and the entry lens 14c constituting the second optical system part 10c can be formed from a plastic material or a glass material.

The above-described first and third optical system parts 10a and 10c guide images formed on the display surfaces 21a and 21c of the first and third display elements 2a and 2c to the position PE of the pupil EYa, and a virtual image is formed at infinity or a position corresponding to infinity on the front-top side as looking from the position PE.

Note that the fourth optical system part 10d is not illustrated, but is the same as or similar to the second optical system part 10b or the third optical system part 10c, and includes an intermediate lens 12d, an exit lens 11d, and the like (see FIG. 5A).

With reference to FIG. 2 again, the display section 20A is an image forming section configured to emit image light L toward the ocular optical system 100A. The display section 20A is driven to operate by the display drive circuit 61A including a D/A converter and the like. The display section 20A includes the first display element 2a disposed in a stage before the first optical system part 10a, the second display element 2b disposed in a stage before the second optical system part 10b, the third display element 2c disposed in a stage before the third optical system part 10c, and the fourth display element 2d disposed in a stage before the fourth optical system part 10d. Images displayed by the display elements 2a to 2d include separate parts or separate areas corresponding to upper-left, lower-left, upper-right, and lower-right parts of an overall unified image. The display elements 2a to 2d can each include a selfluminous organic EL display device, but are not limited to such a device. The display elements 2a to 2d can also each include a liquid-crystal display device illuminated by an LED or another type of backlight, or a laser scanning display device configured to draw by scanning with a laser beam by an MEMS.

Figure 6A:
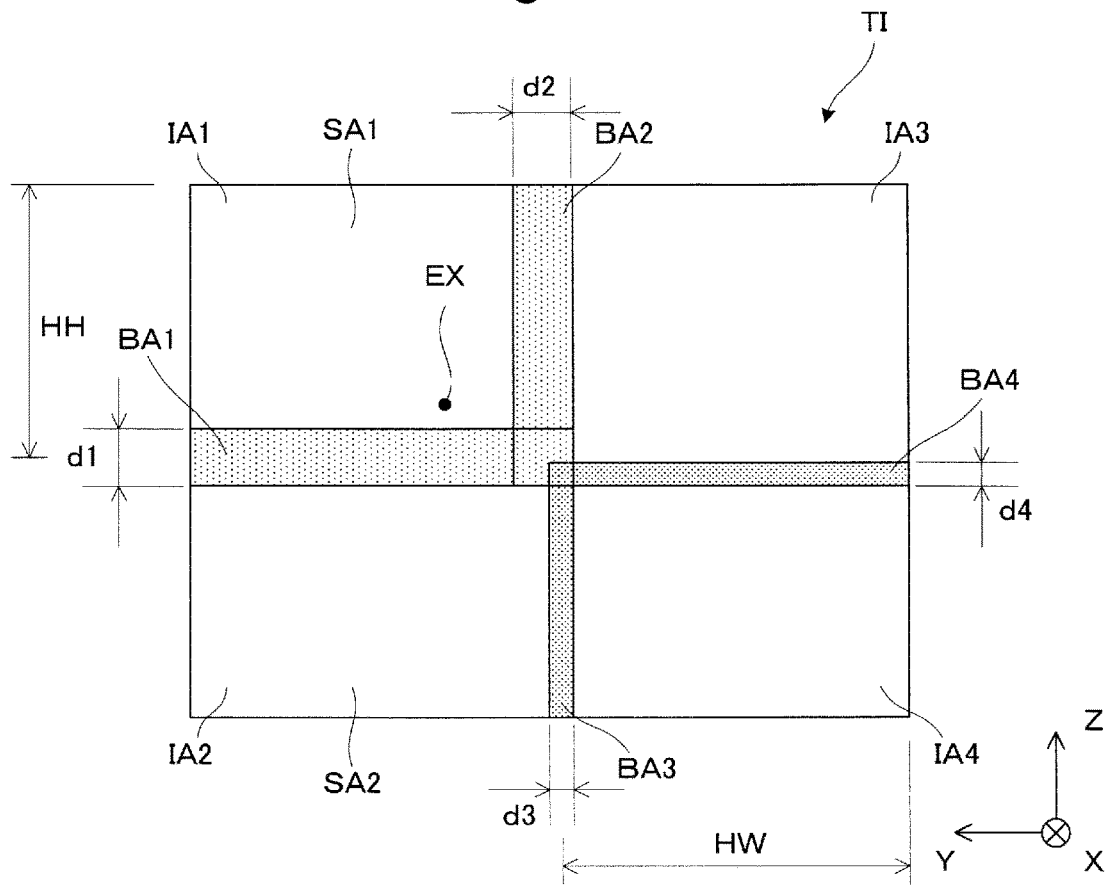
FIG. 6A is an explanatory view illustrating formation of a blending area by an ocular optical system.

FIG. 6A is an explanatory view illustrating formation of a blending area by the ocular optical system 100A illustrated in FIG. 2 and the like. An image region TI in which a virtual image is formed by the ocular optical system 100A is broadly divided into four regions. A partial region IA1 on the upper-left side corresponds to the first optical system part 10a, a partial region IA2 on the lower-left side corresponds to the second optical system part 10b, a partial region IA3 on the upper-right side corresponds to the third optical system part 10c, and a partial region IA4 on the lower-right side corresponds to the fourth optical system part 10d. Here, a blending area BA1 including a comparatively broad over-lapping part extending linearly along a boundary between the regions is formed between the first optical system part 10a and the second optical system part 10b. Additionally, a blending area BA2 including a comparatively broad over-lapping part extending linearly along a boundary between the regions is formed between the first optical system part 10a and the third optical system part 10c. On the other hand, a blending area BA3 including a comparatively narrow overlapping part extending linearly along a boundary between the regions is formed between the second optical system part 10b and the fourth optical system part 10d. Additionally, a blending area BA4 including a compara-tively narrow overlapping part extending linearly along a boundary between the regions is formed between the third optical system part 10c and the fourth optical system part 10d.

Here, the blending area BA1 between the first and second optical system parts 10a and 10b extends uniformly in the Y direction following the boundary between the first and second optical system parts 10a and 10b to make uniform transition of display. The blending area BA1 has an over-lapping angle width d1 comparatively large in the Z direc-tion orthogonal to the boundary. The blending area BA2 between the first and third optical system parts 10a and 10c extends uniformly in the Z direction following the boundary between the first and third optical system parts 10a and 10c to make uniform transition of display. The blending area BA2 has an overlapping angle width d2 comparatively large in the Y direction orthogonal to the boundary.

The blending area BA3 between the second and fourth optical system parts 10b and 10d extends uniformly in the Z direction following the boundary between the second and fourth optical system parts 10b and 10d to make uniform transition of display. The blending area BA3 has an over-lapping angle width d3 comparatively large in the Y direc-tion orthogonal to the boundary. Similarly, the blending area BA4 between the third and fourth optical system parts 10c and 10d extends uniformly in the Y direction following the boundary between the third and fourth optical system parts 10c and 10d. The blending area BA4 has an overlapping angle width d4 comparatively large in the Z direction orthogonal to the boundary.

In the foregoing, the blending area BA1 between the first and second optical system parts 10a and 10b and the blending area BA2 between the first and third optical system parts 10a and 10c are disposed at positions shifted from the visual axis EX and relatively close to the center through which the visual axis EX passes, and have the overlapping angle widths d1 and d2 comparatively large, respectively. On the other hand, the blending area BA3 between the second and fourth optical system parts 10b and 10d and the blending area BA4 between the third and fourth optical system parts 10c and 10d are disposed at positions shifted from the visual axis EX and relatively far from the center through which the visual axis EX passes, and have the overlapping angle widths d3 and d4 comparatively small, respectively. In other words, the blending areas BA1 and BA2 close to the central visual field have comparatively large angle widths, and the blending areas BA3 and BA4 far from the central visual field have comparatively small angle widths. The angle widths of the blending areas on the peripheral visual field side are smaller than the angle widths of the blending areas on the central visual field side. Accord-ingly, the angle widths of the blending areas BA1 and BA2 close to the central visual field are increased, and the angle widths of the blending areas BA3 and BA4 far from the central visual field are reduced, and thus, image transition on the peripheral visual field side can be made gentler than image transition on the central visual field side, and the image transition becomes less noticeable. Note that here, the central visual field side and the peripheral visual field side are described with the visual axis EX as a reference, and an area relatively close to the visual axis EX of a pair of comparable areas is referred to as the central visual field side, and an area relatively far from the visual axis EX of the pair of comparable areas is referred to as the peripheral visual field side. Particularly, when the comparable areas have broad spread and symmetry as in the case of elongated areas, the areas may be compared, for example, with the center of the symmetry as a reference, and when the areas have no symmetry, the areas may be compared, for example, with the center of a contour as a reference.

Figure 6B:
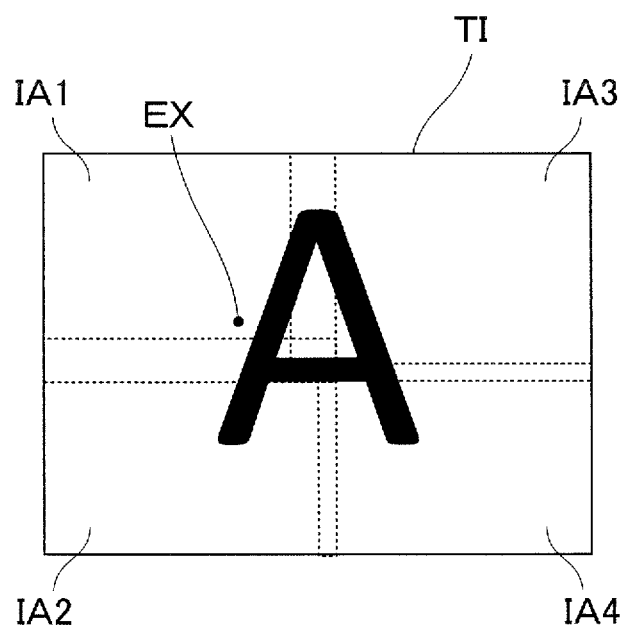
FIG. 6B is a view illustrating a specific example of display by the ocular optical system.

FIG. 6B illustrates a specific example of display in the image region TI observed by the eye EY through the ocular optical system 100A. In each of the blending areas BA1 to BA4, the same image is displayed at an overlapping position to prevent image bleeding and also prevent formation of an abnormal change in brightness and chromaticity. Note that images displayed in the first to fourth optical system parts 10a to 10d are not generally similar to images formed by the first to fourth display elements 2a to 2d, and are deformed by optical distortion of the optical system parts 10a to 10d. Accordingly, when digital distortion correction is applied in advance to add distortion to images formed by the first to fourth display elements 2a to 2d, the distortion of the first to fourth optical system parts 10a to 10d can be corrected, and overlapping images without bleeding can be formed in the respective blending areas BA1 to BA4.

Figure 7A:
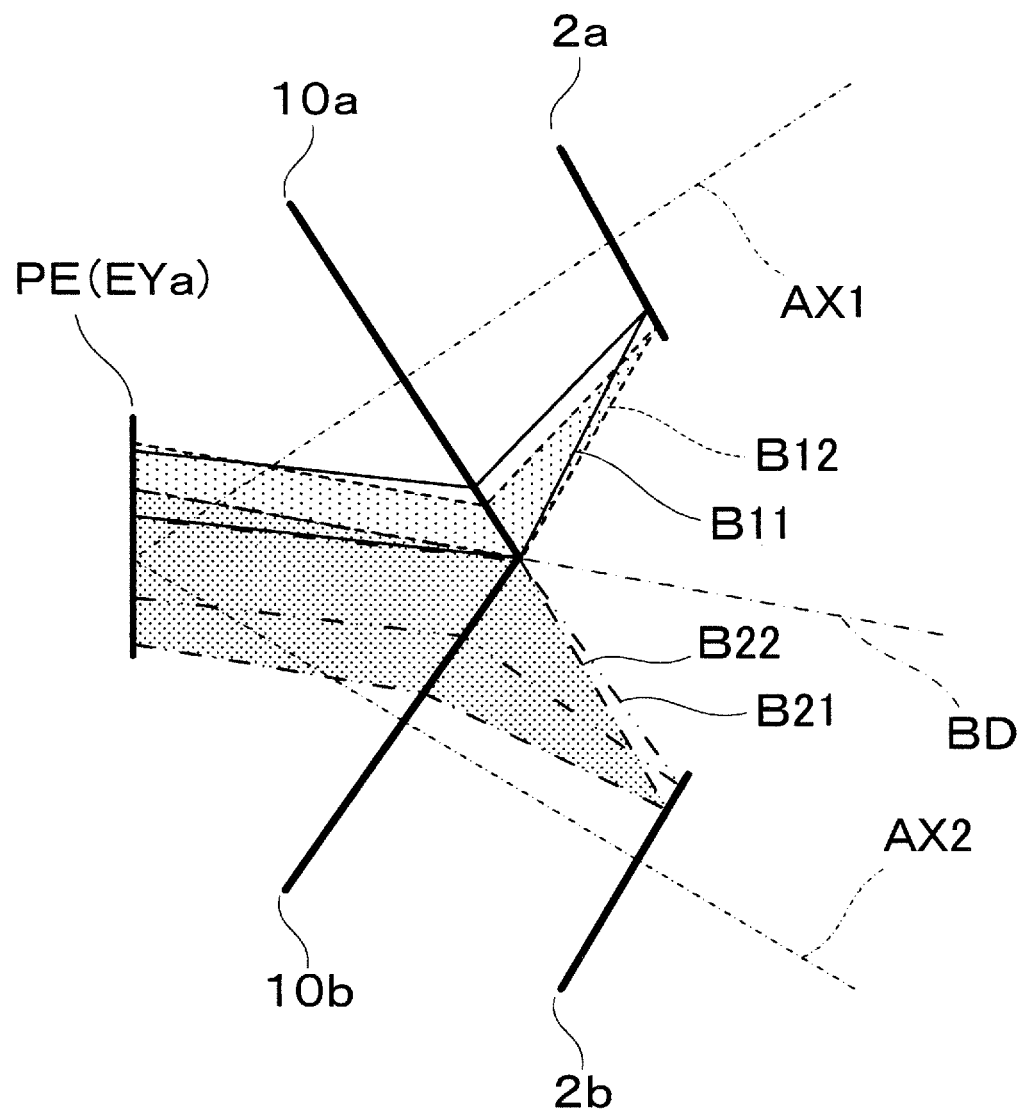
FIG. 7A is an explanatory view illustrating a formation state of a blending area in a vertical direction.
Figure 7B:
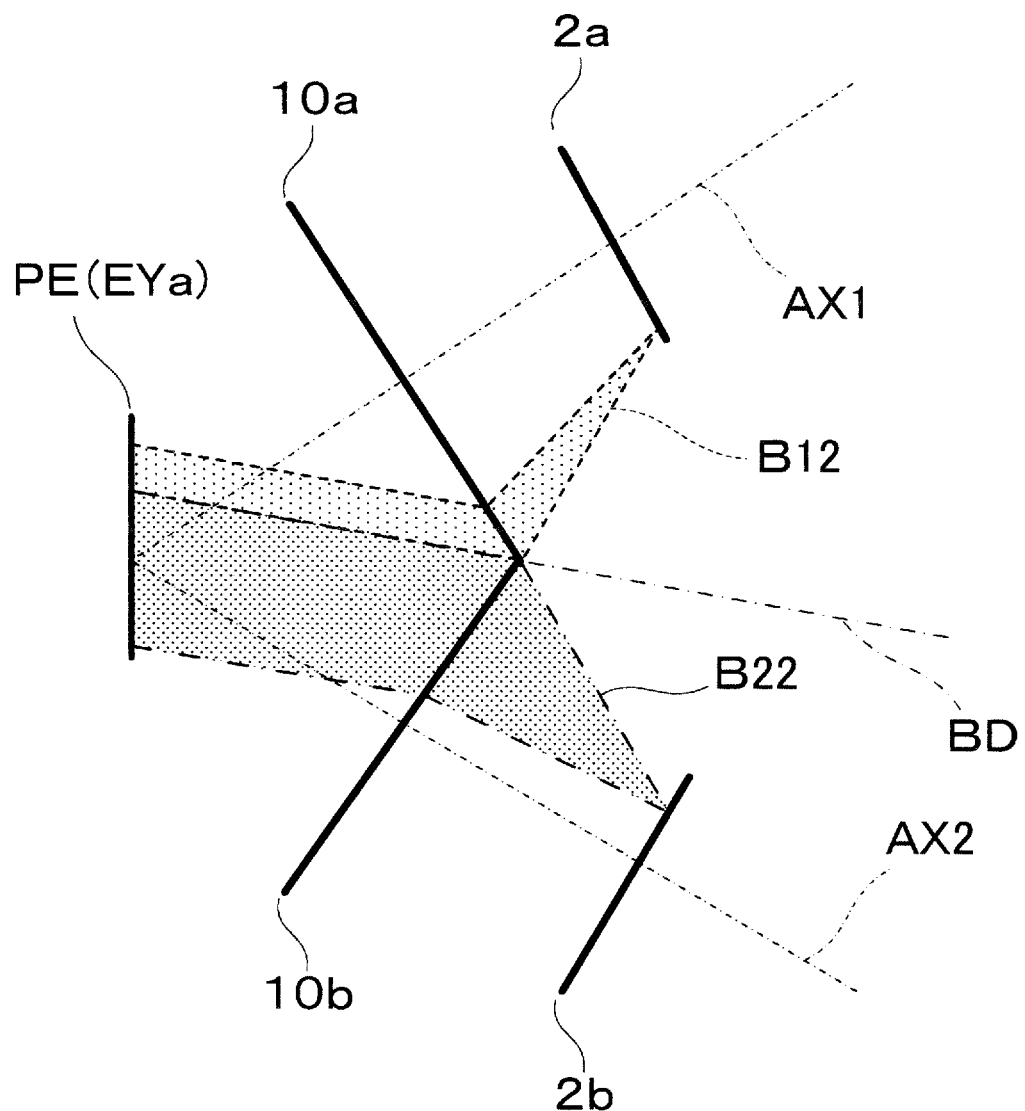
FIG. 7B is an explanatory view illustrating formation of an image at a lower end side of a blending area.

A formation state of a blending area in the vertical direction, specifically, a formation state of the blending area BA1 between the first and second optical system parts 10a and 10b will be described with reference to FIGS. 7A and 7B. In FIG. 7A, a single-dash line BD represents a boundary between the first and second optical system parts 10a and 10b, and corresponds to the center in the vertical direction of the blending area BA1 Furthermore, a single-dash line crossing the first optical system part 10a represents an optical axis AX1 of the first optical system part 10a, and a single-dash line crossing the second optical system part 10b represents an optical axis AX2 of the first optical system part 10a.

Light beams B11 and B12 corresponding to a lower end side image formed by the first optical system part 10a enter the position PE of the pupil EYa, as indicated by a solid line and a broken line. Light beams B21 and B22 corresponding to an upper end side image formed by the second optical system part 10b enter the position PE of the pupil EYa, as indicated by a single-dash line and a double-dash line. At this time, the light beam B12 from the first optical system part 10a and the light beam B22 from the second optical system part 10b overlap with each other to form the same image, and are observed as the blending area BA1 (see FIG. 7B). Note that the light beam B11 from the first optical system part 10a enters a single area SA1 side of the blending area BA1 (see FIG. 6A), and the light beam B21 from the second optical system part 10b enters the single area SA1 side of the blending area BA1 (see FIG. 6A).

As is clear from FIG. 7A, the light beams forming the blending area BA1 have vertical widths different from each other and both enter a local part of the position PE of the pupil EYa. These vertical widths are not easy to control. Accordingly, in the first and second display elements 2a and 2b, intensity adjustment and tone correction may be carried out at a pixel part corresponding to the blending area BA1 to obtain overlapping image brightness closer to brightness of the original image.

Figure 8:
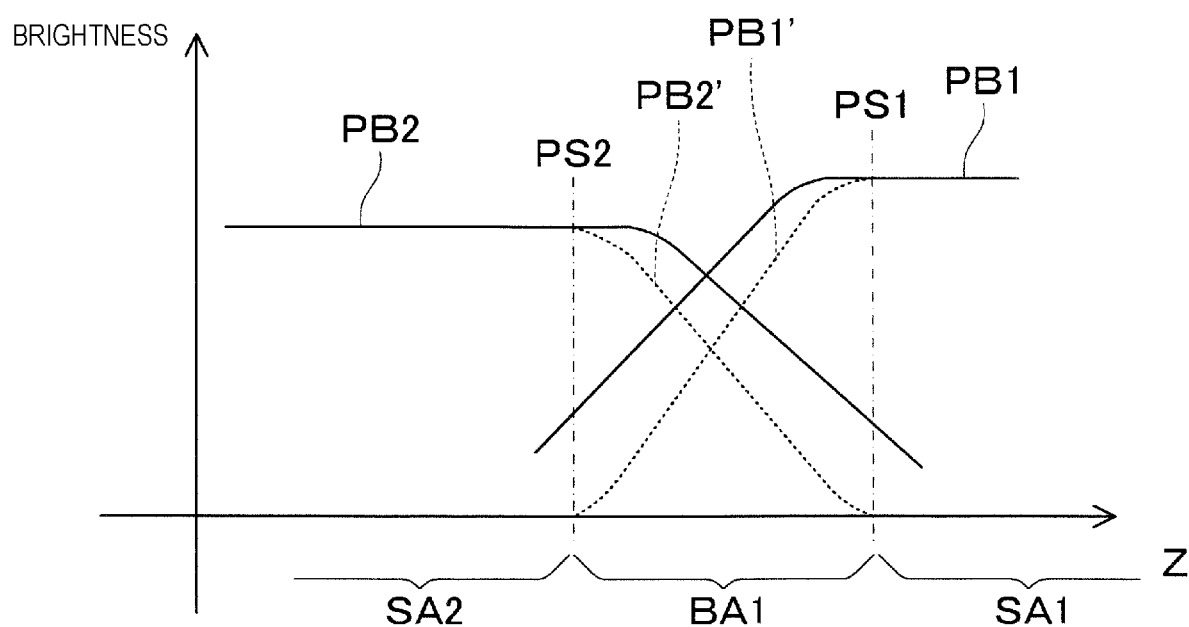
FIG. 8 is an explanatory view illustrating brightness adjustment in a specific blending area.

FIG. 8 is an explanatory view conceptually illustrating brightness adjustment, in other words, correction processing in the blending area BA1. Original projection brightness PB1 by the first optical system part 10a gradually decreases from a predefined location in the blending area BA1 toward the other end. Furthermore, original projection brightness PB2 by the second optical system part 10b gradually decreases from a predefined location in the blending area BA1 toward the other end. To combine images in the blending area BA1, on the first optical system part 10a side, the projection brightness PB1 is gradually decreased from one end position PS1 to the other end position PS2 of the blending area BA1, as indicated by a dotted line PB1', and on the second optical system part 10b side, the projection brightness PB2 is gradually decreased from the one end position PS2 to the other end position PS1 of the blending area BA1, as indicated by a dotted line PB2'. As a result of such correction processing, in the blending area BA1, the light beams from the first optical system part 10a and the light beams from the second optical system part 10b gradually transit between the end positions PS1 and PS2, and image brightness smoothly and gently changes. In other words, screen areas adjacent to each other can be coupled smoothly to each other.

In the example illustrated in FIG. 8, the projection brightness PB1 is not adjusted in the single area SA1 projected onto by the first optical system part 10a. Furthermore, the projection brightness PB2 is not adjusted in a single area SA2 projected onto by the second optical system part 10b. However, a relative ratio between brightness of the first optical system part 10a and brightness of the second optical system part 10b can also be adjusted. In this case, higher brightness of any of the first and second optical system parts 10a and 10b is generally lowered by a prescribed ratio. Furthermore, the projection brightness PB1 and PB2 are generally non-uniform in the single areas SA1 and SA2, and brightness distribution can be adjusted or corrected in each of the single areas SA1 and SA2.

Figure 9:
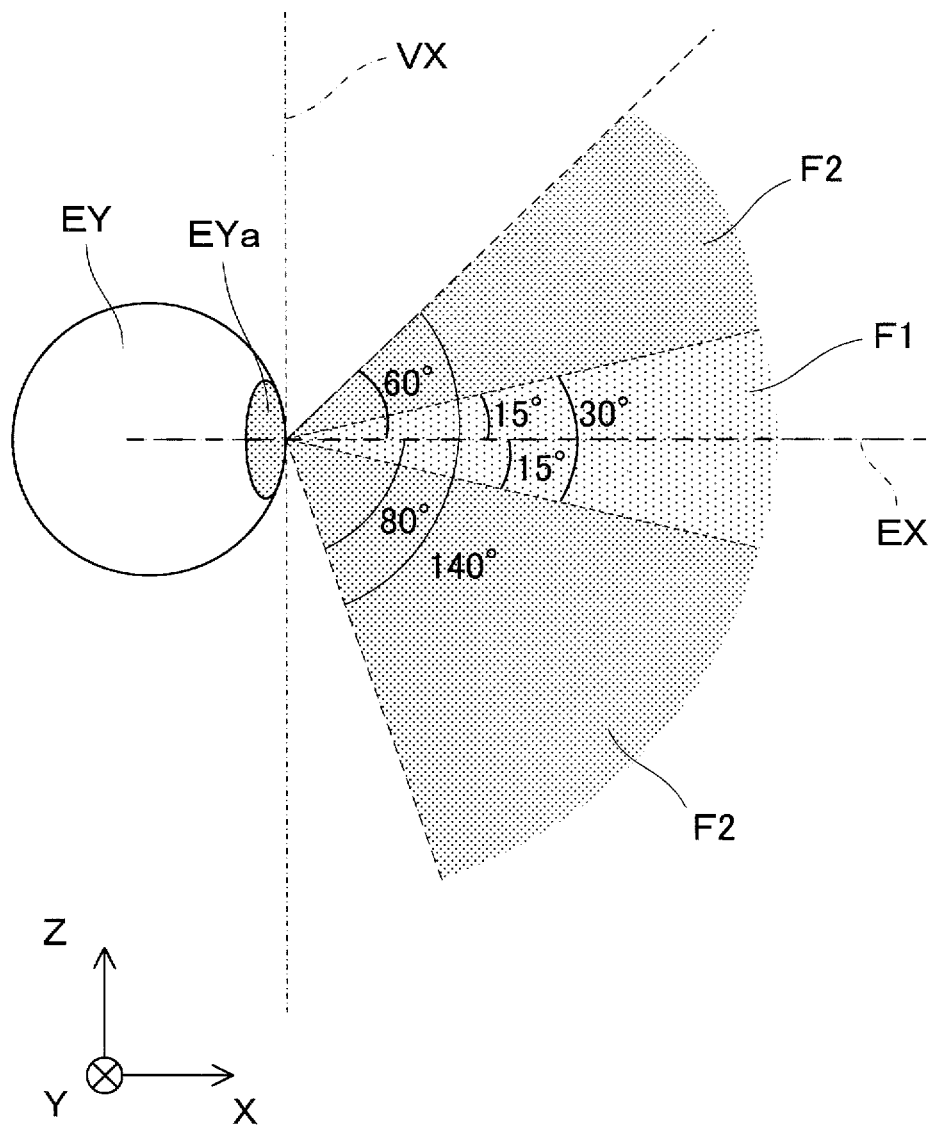
FIG. 9 is an explanatory view illustrating a central visual field and a peripheral visual field of a person in a vertical direction.

FIG. 9 is an explanatory view illustrating a central visual field, and a peripheral visual field of a person in the vertical direction. When the person looks at a subject, the person observes an area in the range of several degrees at high resolution, but observes the other peripheral areas at low resolution. Even when the eye EY of the person rotates or moves according to the subject, the subject becomes difficult to see, and thus the person rotates the head in an attempt to maintain a forward line of sight. Therefore, a central visual field F1 is assumed to be of approximately ±15° to the left/right or inside/outside from the visual axis EX of the eye EY as a reference when the eye EY is looking forward, and it can be considered to be practical for the ocular optical system 100A or the image display device 200 to increase resolution in the central visual field F1. Furthermore, it can be considered to be practical for the ocular optical system 100A or the image display device 200 to ensure a peripheral visual field F2 of approximately 60° above and 80° below the visual axis EX as a reference on the outside of the central visual field F1. Note that the peripheral visual field F2 is generally tilted downward relative to a vertical axis VX.

From this standpoint, a visual field angle β1 on the upper side of the ocular optical system 100A for the right eye is set to be approximately 60°, and a visual field angle β2 on the lower side of the ocular optical system 100A for the right eye is set to be approximately 80°. Here, the first optical system part 10a on the upper side or the forward side illustrated in FIG. 3 and the like substantially covers the central visual field F1, and projects an image at comparatively high resolution and comparatively high accuracy. On the other hand, the second optical system part 11b on the lower side illustrated in FIG. 3 and the like covers a part of the peripheral visual field F2, and projects an image at comparatively low resolution or comparatively low accuracy. Note that the visual axis EX passes through the center of the central visual field F1, and the blending area BA1 illustrated in FIG. 6A is formed at a position extending from below the central visual field F1 toward the peripheral visual field F2. The blending area BA1 can be an area crossing the center of the central visual field F1, but can also be shifted downward to be located completely in the peripheral visual field F2.

Figure 10:
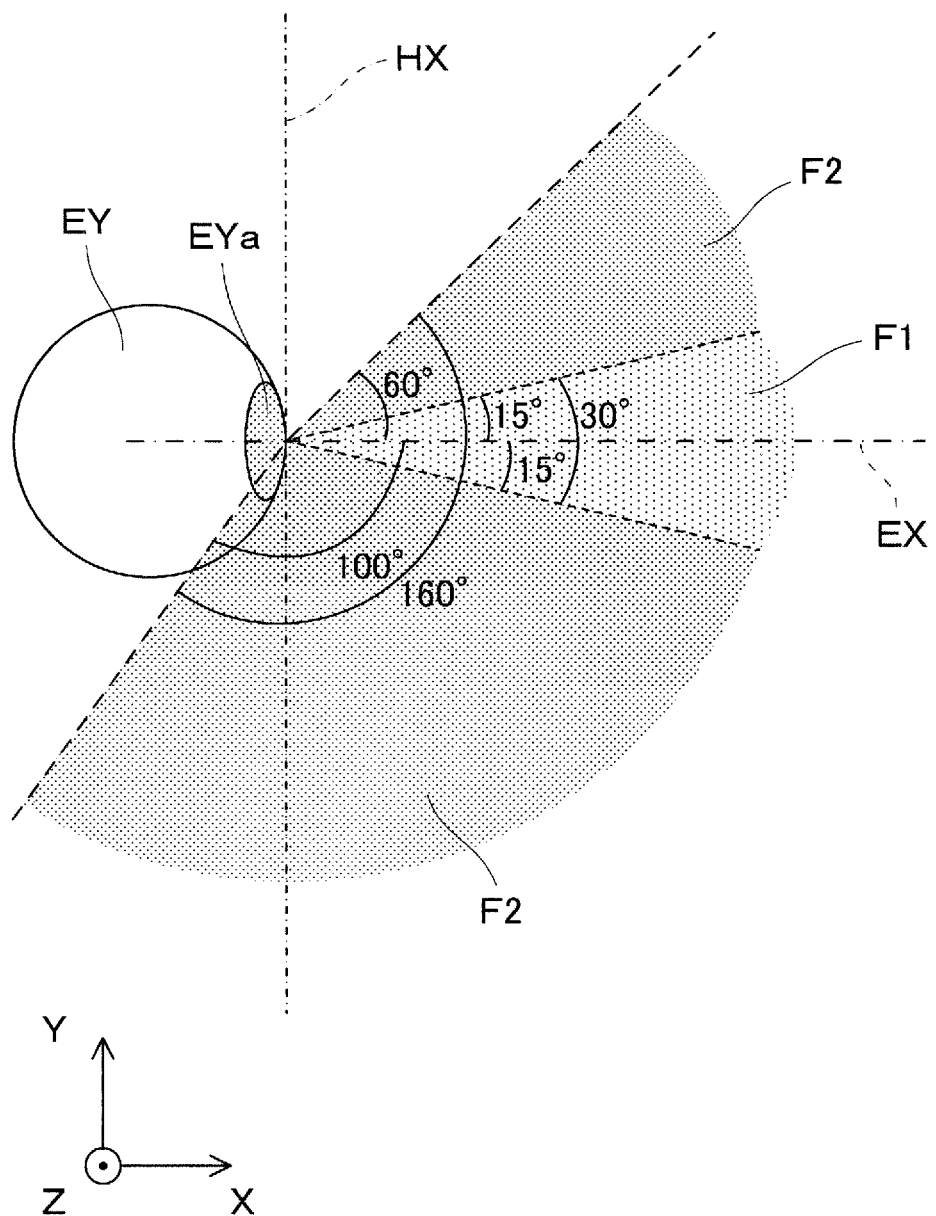
FIG. 10 is an explanatory view illustrating a central visual field and a peripheral visual field of a person in a horizontal direction.

FIG. 10 is an explanatory view illustrating the central visual field, and the peripheral visual field of a person in the horizontal direction. The central visual field F1 is assumed to be of approximately ±15° to the left/right or inside/outside from the visual axis EX of the eye EY as a reference when the eye EY is looking forward, and it can be considered to be practical for the ocular optical system 100A or the image display device 200 to increase resolution in the central visual field F1. Furthermore, in the case of the right eye, it can be considered to be practical for the ocular optical system 100A or the image display device 200 to ensure the peripheral visual field F2 of approximately 60° inside and 100° outside the visual axis EX as a reference on the outside of the central visual field F1. Note that the peripheral visual field F2 is generally tilted outward relative to a horizontal axis HX along which both the eyes are arranged.

From this standpoint, a visual field angle α1 on the inner side of the ocular optical system 100A for the right eye is set to be approximately 60°, and a visual field angle α2 on the outer side of the ocular optical system 100A for the right eye is set to be approximately 100°. Here, the first optical system part 10a on the upper side or the forward side substantially covers the central visual field F1, and projects an image at comparatively high resolution and comparatively high accuracy. On the other hand, the second optical system part 10c on the outer side covers a part of the peripheral visual field F2, and projects an image at comparatively low resolution or comparatively low accuracy. Note that the visual axis EX passes through the center of the central visual field F1, and the blending area BA2 illustrated in FIG. 6A is formed at a position extending from the right side of the central visual field F1 toward the peripheral visual field F2. The blending area BA2 can be an area crossing the center of the central visual field F1, but can also be shifted rightward to be located completely in the peripheral visual field F2.

The peripheral visual field F2 is not limited to be of a visual field angle from 140° or 160° as described above, and a visual field angle of 200° can be secured.

In the ocular optical system 100A, when the display area is divided in the vertical direction and the lateral direction by the first to fourth optical system parts 10a to 10d as described above, the angle widths in the vertical direction of the blending areas BA1 and BA4, in other words, the overlapping angle widths d1 and d4 may each be half or no more than ¼ a vertical half viewing angle HH of the image region TI overall, and the angle widths in the lateral direction of the blending areas BA2 and BA3, in other words, the overlapping angle widths d2 and d3 may each be half or no more than ¼ a lateral half viewing angle HW of the image region TI overall. Accordingly, excessive overlap of the optical system parts 10a to 10d can be prevented, and the optical system parts 10a to 10d can be used effectively to enable a weight reduction and simplification of the ocular optical system 100A.

In other words, an angle θ of each of the optical axes AX1 and AX2 of the first and second optical system parts 10a and 10b relative to the visual axis EX is set to be smaller than half the half viewing angle by design of the ocular optical system 100A. In terms of the optical system parts 10a and 10b individual, the angle θ of each of the optical axes AX1 and AX2 in the vertical Z direction relative to the visual axis EX of the first and second optical system parts 10a and 10b is in the range given by Relationship (1) below, where α represents a vertical viewing angle of each of the optical system parts 10a and 10b.

$$0 < \{(\alpha/2 - \theta)/\alpha\} < 0.4 \quad (1)$$

Figure 5B:
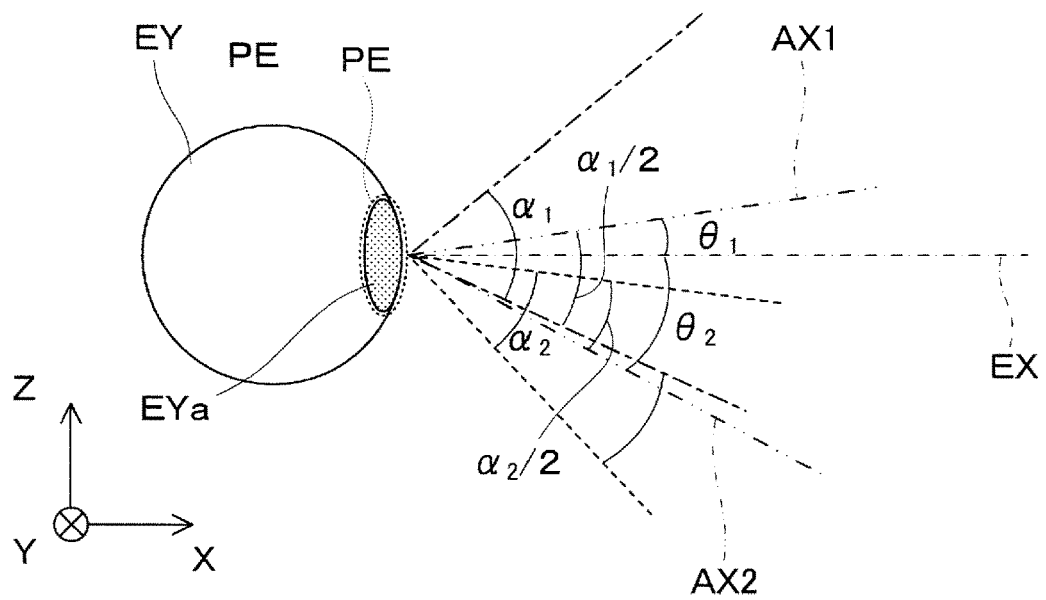
FIG. 5B is an explanatory view illustrating relationships between optical axes, viewing angles, and the like of first and second optical system parts.

Note that when there is a large difference between the viewing angles of the optical system parts 10a and 10b, as for the first optical system part 10a, for example, a ratio at which the blending area BA1 with the second optical system part 10b falls within the viewing angle $\alpha_1$ is expressed by the relationship below, where $\alpha_1$ and $\alpha_2$ represent the viewing angles of the first and second optical system parts 10a and 10b, respectively, and $\theta_1$ and $\theta_2$ represent inclination angles of the optical axes AX1 and AX2 relative to the visual axis EX, respectively (see FIG. 5B).

$$0 < \frac{\left|(\theta_1 + \theta_2) - \left(\frac{\alpha_1 + \alpha_2}{2}\right)\right|}{\alpha 1} < 0.4$$

Similarly, the angle θ of each of the optical axes in the vertical Z direction relative to the visual axis EX of the third and fourth optical system parts 10c and 10d is in the range given by Relationship (1) above, where α represents a vertical viewing angle of the ocular optical system 100A.

Similarly, the angle θ of each of the optical axes AX1 and AX3 in the lateral Y direction relative to the visual axis EX of the first and third optical system parts 10a and 10c is in the range given by Relationship (1) above, where α represents the lateral viewing angle of the ocular optical system 100A.

Similarly, the angle θ of each of the optical axes in the lateral Y direction relative to the visual axis EX of the second and fourth optical system parts 10b and 10d is in the range given by Relationship (1) above, where α represents the lateral viewing angle of the ocular optical system 100A.

Particularly, as for the first and second optical system parts 10a and 10b related to the central visual field, the angle θ of each of the optical axes AX in the vertical Z direction relative to the visual axis EX may be in the range given by Relationship (2) below.

$$0.03 < \{(\alpha/2 - \theta)/\alpha\} < 0.4 \quad (2)$$

Similarly, as for the first and third optical system parts 10a and 10c related to the central visual field, the angle θ of each of the optical axes AX in the lateral Y direction relative to the visual axis EX may be in the range given by Relationship (2) above.

In a specific example, the angle θ of each of the optical axes AX of optical system parts relative to the visual axis EX is approximately 10°, for example.

Figure 11A:
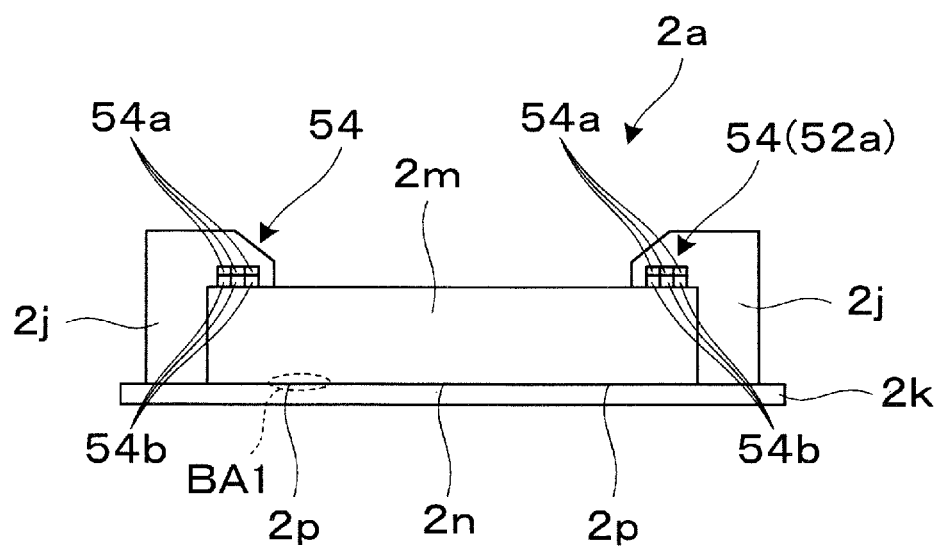
FIG. 11A is an explanatory side cross-sectional view illustrating an example of a monitor device.
Figure 11B:
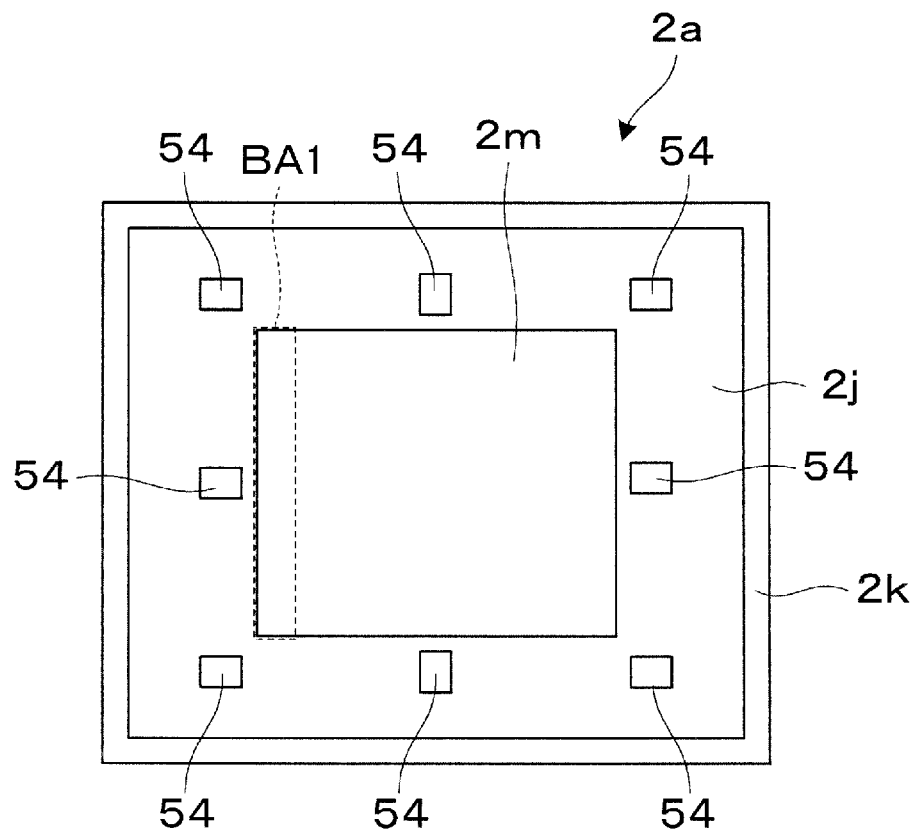
FIG. 11B is an explanatory partial perspective plan view illustrating an example of a monitor device.

FIG. 11A is a side cross-sectional view illustrating the display element 2a disposed to face the first optical system part 10a, and FIG. 11B is a partial perspective plan view of the display element 2a. The display element 2a includes an organic EL display device, for example. The monitor device 52a includes a plurality of sensors 54 disposed at an equal interval to be embedded on the inner side of a fixing jig 2j along a periphery of the fixing jig 2j of the display element 2a. The fixing jig 2j is fixed to a backplane 2k of the display element 2a, and a display portion 2n configured to form an image by emitting light is formed between the backplane 2k and protective glass 2m. The display portion 2n corresponds to the display surface 21a and the like illustrated in FIG. 3.

Each of the sensors 54 includes three photodiodes 54a and three color filters 54b. The sensors 54 are disposed to face a peripheral part 2p of the display portion 2n of the display element 2a, and detect display brightness, and chromaticity of the peripheral part 2p. Accordingly, both brightness and chromaticity of a part corresponding to the above-described blending area BA1 on the display surface 21a of the display element 2a can be measured, and display brightness, and chromaticity of the display surface 21a overall of the display element 2a can also be measured.

Figure 12A:
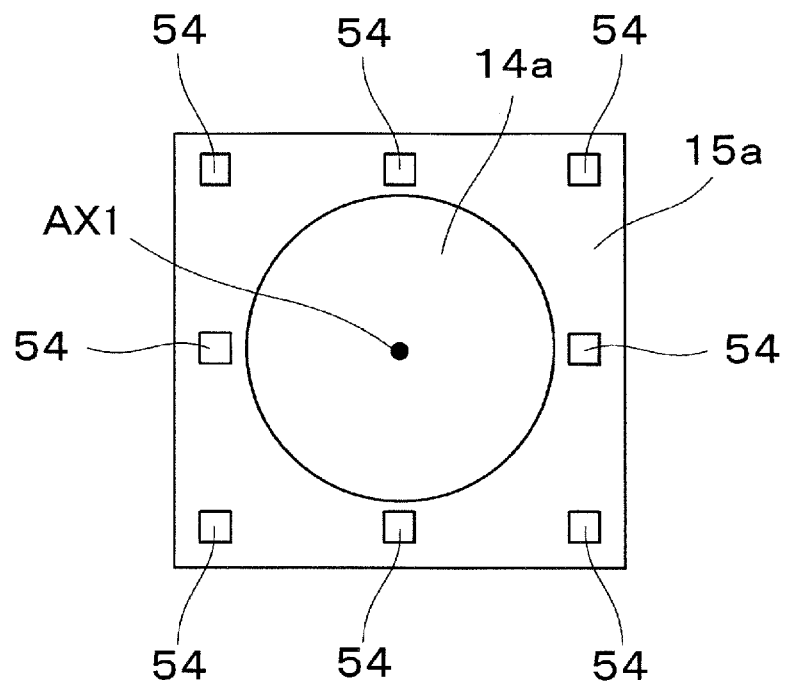
FIG. 12A is an explanatory rear view illustrating a monitor device of a modification.
Figure 12B:
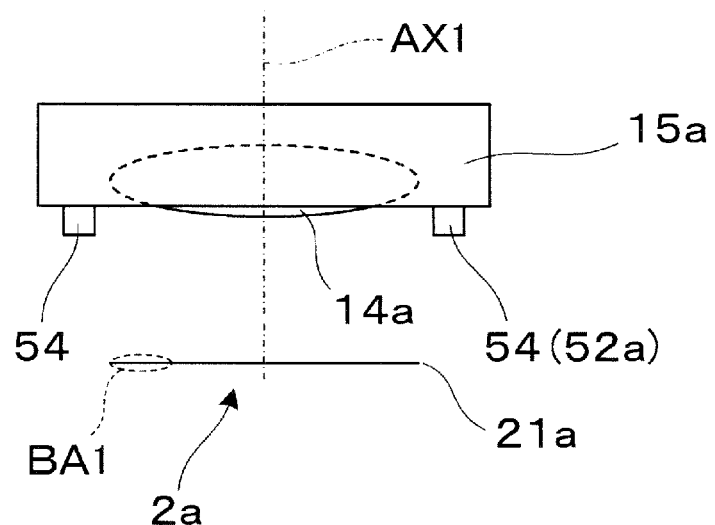
FIG. 12B is an explanatory side view illustrating a monitor device of the modification.

The monitor device 52a accompanying the first optical system part 10a or the display element 2a is described above, but the monitor devices 52b to 52d accompanying the second to fourth optical system parts 10b to 10d or the display elements 2b to 2d also each have a structure similar to the structure of the monitor device 52a. FIGS. 12A and 12B are explanatory views each illustrating a modification of the monitor device 52a illustrated in FIG. 11A and the like. FIG. 12A is a plan view illustrating the entry lens 14a closest to the display element 2a in the first optical system part 10a, and a holding frame 15a for the entry lens 14a, and FIG. 12B is a cross-sectional view taken along the optical axis AX1.

The monitor device 52*a* includes the plurality of sensors 54 disposed at an equal interval to be embedded on the display element 2*a* side of the holding frame 15*a* along a periphery of the holding frame 15*a*. In this case, similarly, both brightness and chromaticity of a part corresponding to the blending area BA1 on the display surface 21*a* of the display element 2*a* can be measured, and display brightness, and chromaticity of the display surface 21*a* overall of the display element 2*a* can also be measured.

Figure 13:
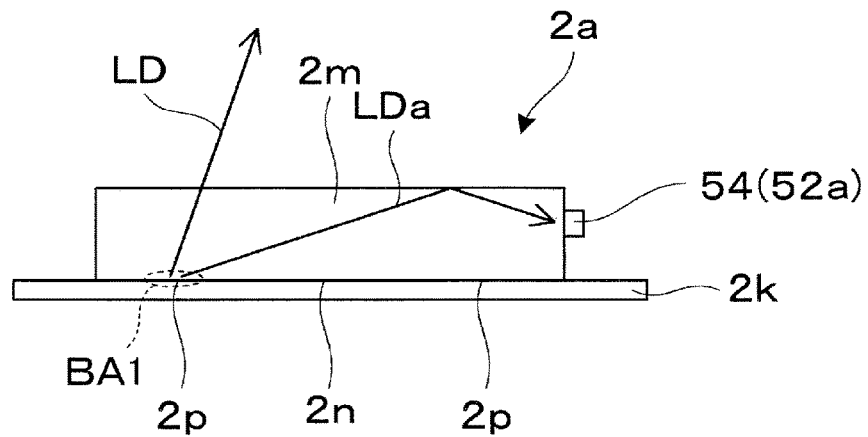
FIG. 13 is an explanatory side cross-sectional view illustrating a monitor device of another modification.

FIG. 13 is an explanatory view illustrating another modification of the monitor device 52*a* illustrated in FIG. 11A and the like. In this case, the sensor 54 constituting the monitor device 52*a* serves as a compact diode, for example, and is fixed to a side surface of the protective glass 2*m*. The sensor 54 is not limited to be one sensor, and a plurality of the sensors 54 can be provided. Partial light LDa of display light LD from the blending area BA1 of the display surface 21*a* or the display portion 2*n* of the display element 2*a* can be guided to the sensor 54 by using full reflection at a surface of the protective glass 2*m*. In this case, although not illustrated in detail, when the display element 2*a* includes three color filters to change a display color, the partial light LDa significantly inclines, and therefore, which color filter an optical path of the partial light LDa passes through also becomes a matter, and stray light is also generated. Thus, a size and a position of the sensor 54 are to be set in a system including the color filters, and a detection signal is to be subjected to prescribed processing. Specifically, even when the partial light LDa including stray light is detected at the time of manufacturing of a product, a correction formula is to be prepared to determine brightness and chromaticity from measurement results of the sensor 54. Specifically, brightness and chromaticity of the blending area responsible for smoothly coupling image regions can be measured correctly by activating image light of the blending area in the display element 2*a* in question.

Figure 14:
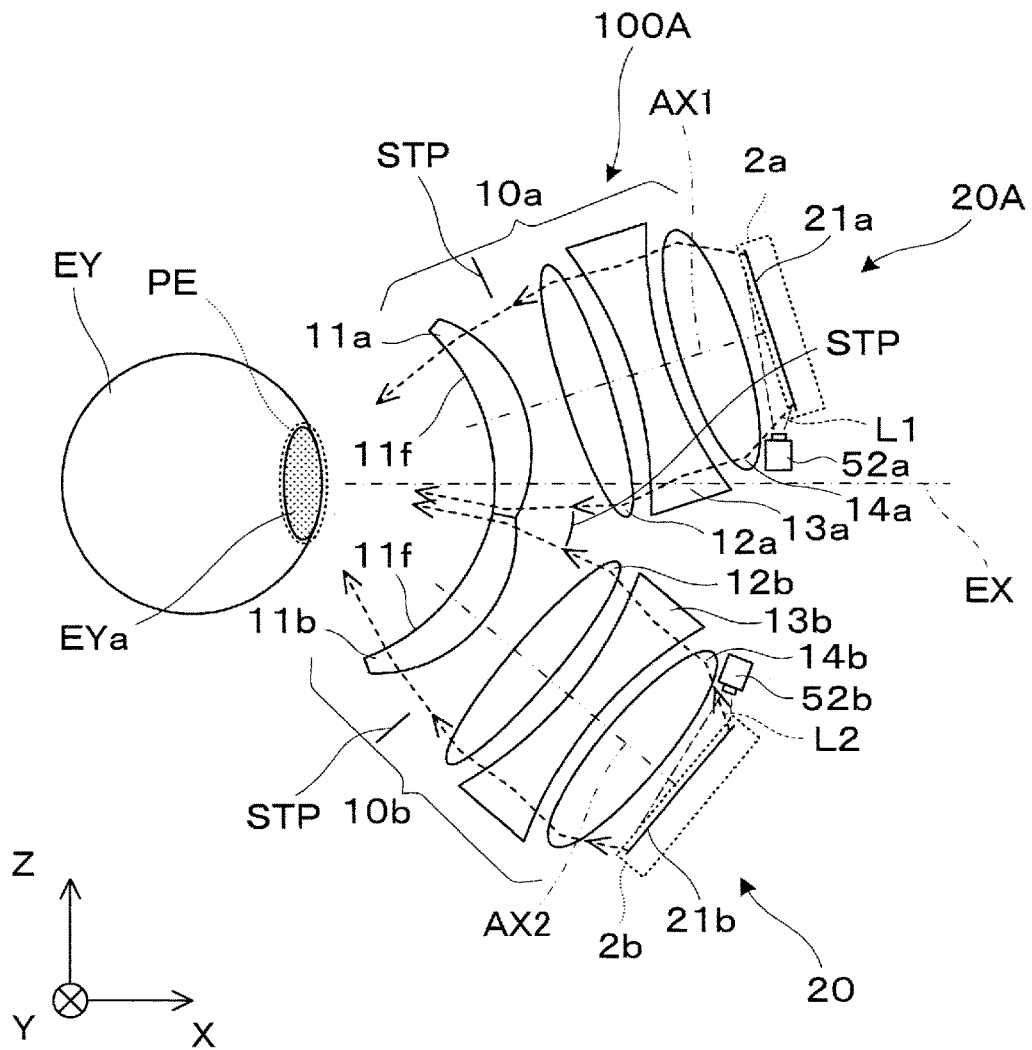
FIG. 14 is an explanatory cross-sectional view illustrating a monitor device of yet another modification.

FIG. 14 is an explanatory view illustrating yet another modification of the monitor device 52*a* illustrated in FIG. 11A and the like. In this case, the monitor devices 52*a* and 52*b* each serve as a compact camera, and can collectively capture the display surfaces 21*a* and 21*b* of the display elements 2*a* and 2*b* to measure display brightness, and chromaticity of the display surface 21*a* and 21*b* overall of the display element 2*a* and 2*b*. As a result, both brightness and chromaticity of a part corresponding to the blending area BA1 can be measured.

Note that as for the entry lenses 14*a* and 14*b* closest to the display elements 2*a* and 2*b*, refractive indices may be adjusted to cause image light from the display elements 2*a* and 2*b* to enter the monitor devices 52*a* and 52*b* each serving as a compact camera.

Figure 15:
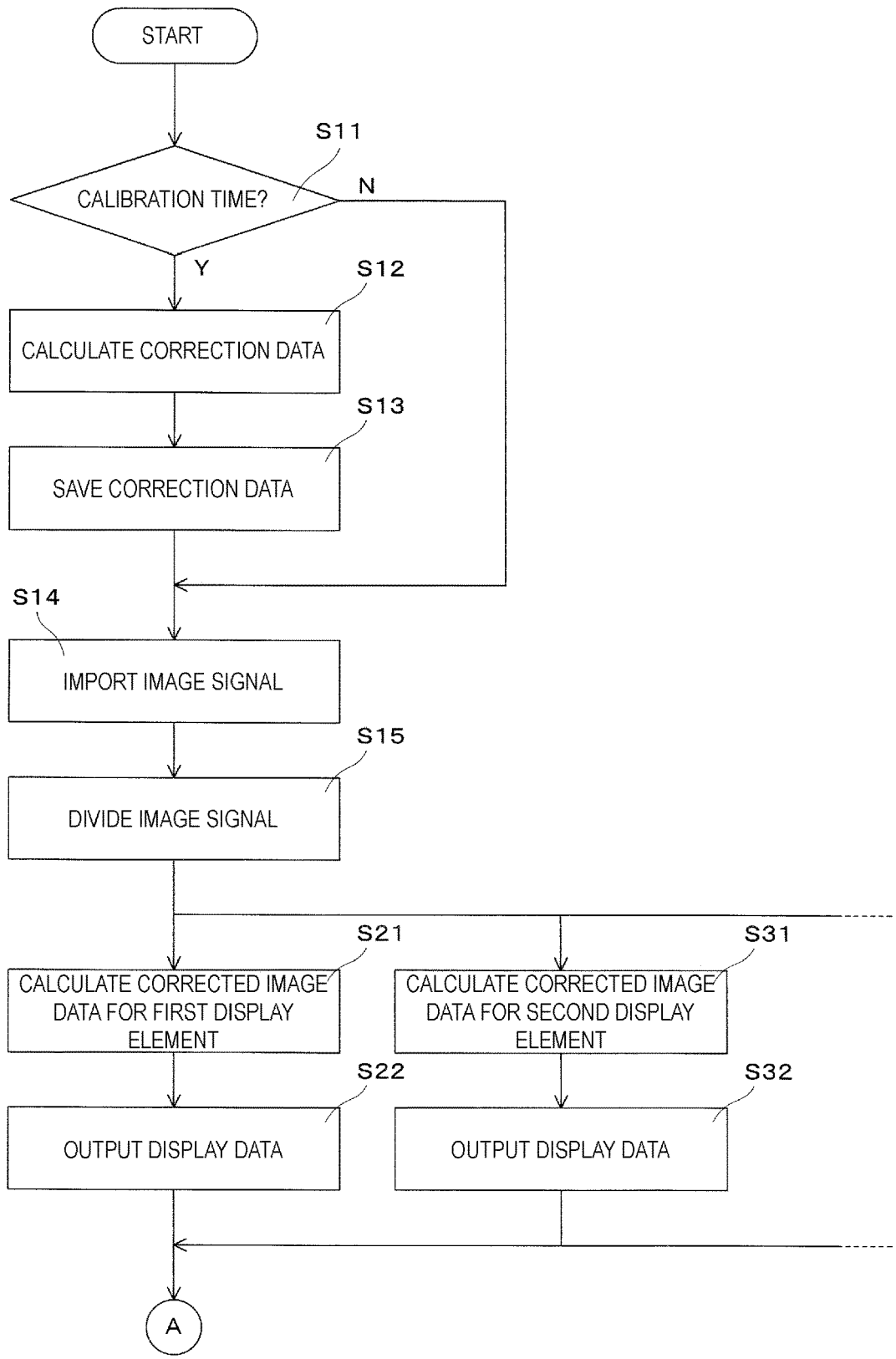
FIG. 15 is an explanatory view illustrating an example of a display operation by the image display device illustrated in FIG. 1.
Figure 16:
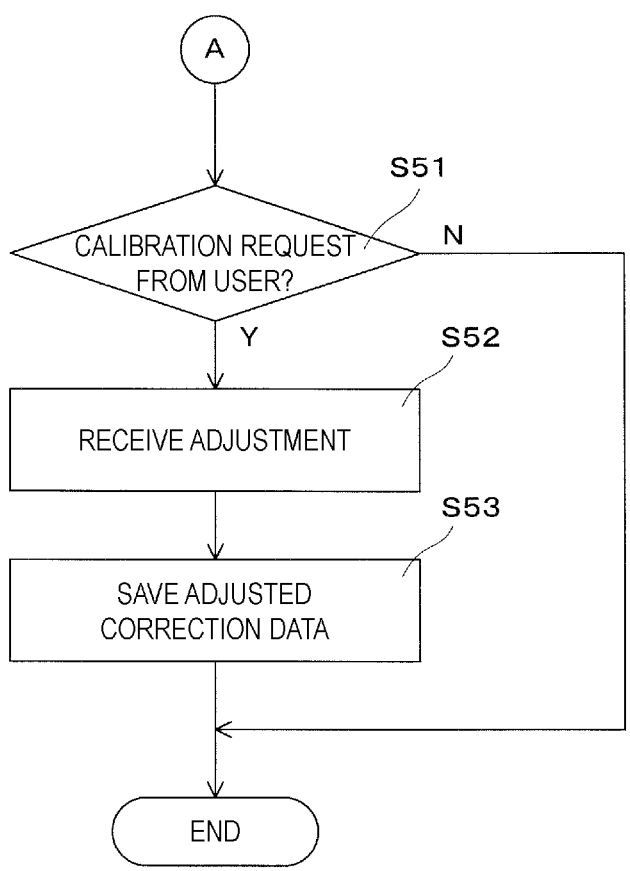
FIG. 16 is an explanatory view illustrating an example of a display operation by the image display device illustrated in FIG. 1.

An example of display operations by the image display device 200 or the image display unit 200A illustrated in FIG. 1 will be described with reference to FIGS. 15 and 16.

The control circuit unit 80 determines whether it is time for calibration (step S11). The control circuit unit 80 determines whether it is time for calibration based on various types of information such as startup time and continuous usage time. In other words, the time for calibration can be set at startup time of the image display device 200 and the like.

When the control circuit unit 80 determines that it is time for calibration, the control circuit unit 80 calculates correction data based on output of the monitor devices 52*a* to 52*d* (step S12), and records correction data in memory 81 (step S13). Specifically, the control circuit unit 80 causes the ocular optical system 100A to display a completely white screen. While the completely white screen is thus displayed, the sensors 54 of the monitor devices 52*a* to 52*d* measure image light of the blending areas BA1 to BA4, and determine brightness and chromaticity of the blending areas BA1 to BA4. The brightness and the chromaticity thus obtained are compared with brightness and color distribution of reference values to create a correction table, and the correction table is saved in the memory 81. Here, the brightness and color distribution of reference values can be values set at the time of shipping of a product from a factory, for example, but can also be values set at the last startup time or at startup time after a prescribed number of times of startup. The correction table in the memory 81 can be updated each time brightness and chromaticity are measured, to automatically correspond to a change over time in the image display elements. Note that the correction table includes brightness adjustment and color correction of the blending areas BA1 to BA4 as illustrated in FIG. 8, and also includes correction of brightness and color distribution outside the blending areas BA1 to BA4.

The control circuit unit 80 imports an image signal input from the exterior, and an image signal stored in the memory 81 (step S14).

The control circuit unit 80 divides the image signal imported at step S13 in accordance with the number and apportioned areas of the display elements 2*a* to 2*d* (step S15). In this case, the blending areas BA1 to BA4 are assigned in an overlapping manner.

Subsequently, the control circuit unit 80 subjects the image signal for the first display element 2*a* obtained at step S15 to the correction processing by referring to the correction data recorded at step S13, and calculates the corrected image data for the first display element 2*a* (step S21). In parallel with this processing, the control circuit unit 80 subjects the image signal for the second display element 2*b* obtained at step S15 to the correction processing by referring to the correction data recorded at step S13, and calculates the corrected image data for the second display element 2*b* (step S31). Although not described in detail, corrected image data for the third display element 2*c*, and corrected image data for the fourth display element 2*d* are obtained in the same manner.

Subsequently, the control circuit unit 80 outputs the corrected image data obtained at step S21 to the display drive circuit 61A, and causes the display element 2*a* to correspondingly display (step S22). In parallel with this processing, the control circuit unit 80 outputs the corrected image data obtained at step S31 to the display drive circuit 61A, and causes the display element 2*b* to correspondingly carry out display (step S32). Although not described in detail, display operations of the third display element 2*c*, and display operations of the fourth display element 2*d* are carried out in the same manner.

Subsequently, the control circuit unit 80 determines whether a user has made a calibration request (step S51). A user can operate the operation control unit 90 to send a calibration request to the control circuit unit 80.

When the control circuit unit 80 receives the calibration request from the user, the control circuit unit 80 receives setting from the user for correction processing (step S52). In other words, the control circuit unit 80 receives a modification for adjusting the correction data recorded at step S13. Specifically, the control circuit unit 80 causes the ocular optical system 100A to display a completely white screen. The user operates the operation control unit 90 to increase and decrease data parameters of the correction data while referring to the screen to balance brightness and color distribution of each area such as the blending areas BA1 to BA4 and the single areas SA1 and SA2 in the completely white screen being displayed, specifically, in the image region TI illustrated in FIG. 6A. In this case, the adjustment can be made independently for each of the left and right eyes, and such setting is received individually. The calibration request from the user is received in this manner, and thus, a variation or degradation over time in display brightness and chromaticity can be handled.

Subsequently, when the control circuit unit 80 receives instruction of correction data finalization from the user, the control circuit unit 80 records the adjusted correction data in the memory 81 (step S53).

In the next image display and subsequent display, the image signals for the display elements 2a to 2d are corrected by referring to the correction data saved at step S53, and thus, a changes over time in the image display element can be handled.

As is clear from the foregoing, according to the image display device 200 of this Exemplary Embodiment, the overlapping angle widths d1 to d4 in the direction orthogonal to the boundaries of the blending areas BA1 to BA4 on the peripheral visual field side are smaller than the overlapping angle widths d1 to d4 in the direction orthogonal to the boundaries of the blending areas BA1 to BA4 on the central visual field side. Thus, a seam between images on the central visual field side can be made less noticeable, and a seam between images on the peripheral visual field side can be narrowed to reduce overlap between optical systems. Accordingly, a boundary can be prevented from being noticeable at a seam between separate image regions, and an increase in a viewing angle and a size reduction can be achieved.

Second Exemplary Embodiment

An ocular optical system and the like according to Second Exemplary Embodiment will be described hereinafter. The ocular optical system according to this Exemplary Embodiment is a modification of the ocular optical system of First Exemplary Embodiment, and the same parts as in First Exemplary Embodiment will not be described.

Figure 17:
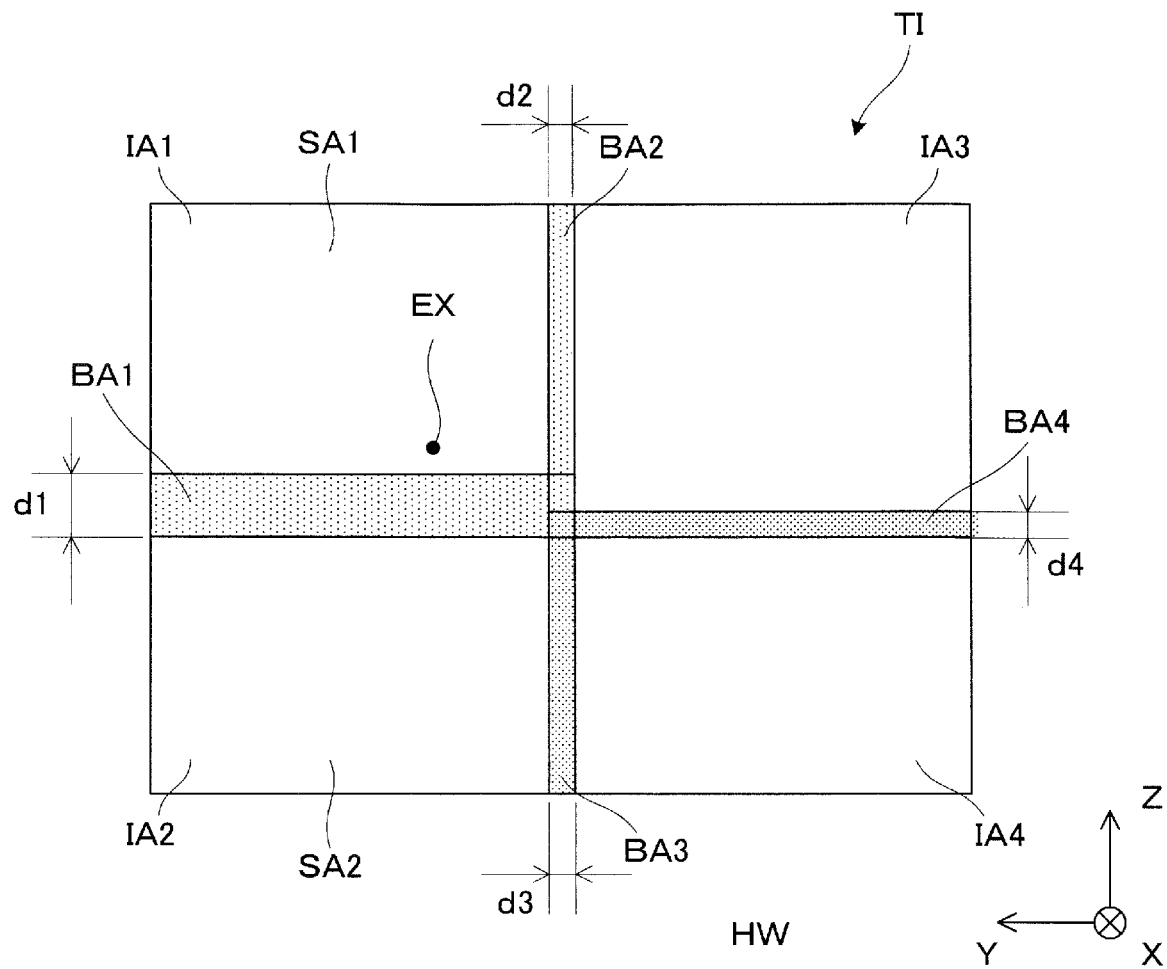
FIG. 17 is an explanatory side cross-sectional view illustrating an image display device according to Second Exemplary Embodiment.

FIG. 17 is an explanatory view illustrating setting of a blending area in the ocular optical system of Second Exemplary Embodiment, and corresponds to FIG. 6A. In this case, an overlapping angle width d2 in a lateral direction of a blending area BA2 between first and third optical system parts 10a and 10c is smaller than an overlapping angle width d1 in a vertical direction of a blending area BA1 between first and second optical system parts 10a and 10b. The vertical direction overlap is broadened in this manner, and thus, an overall laterally broad image can be projected by a comparatively small optical system. Note that under different circumstances, for example, when the overall vertical viewing angle is relatively large, the overlapping angle widths in the lateral direction of the blending areas extending in the vertical direction may be larger than the overlapping angle widths in the vertical direction of the blending areas extending in the lateral direction. The overlapping angle widths in the lateral direction of the blending areas extending in the vertical direction is relatively large, and thus, the blending areas can be made less noticeable in terms of sensitivity of human eyes.

Third Exemplary Embodiment

An ocular optical system and the like according to Third Exemplary Embodiment will be described hereinafter. The ocular optical system according to this Exemplary Embodiment is a modification of the ocular optical system of First Exemplary Embodiment, and the same parts as in First Exemplary Embodiment will not be described.

Figure 18:
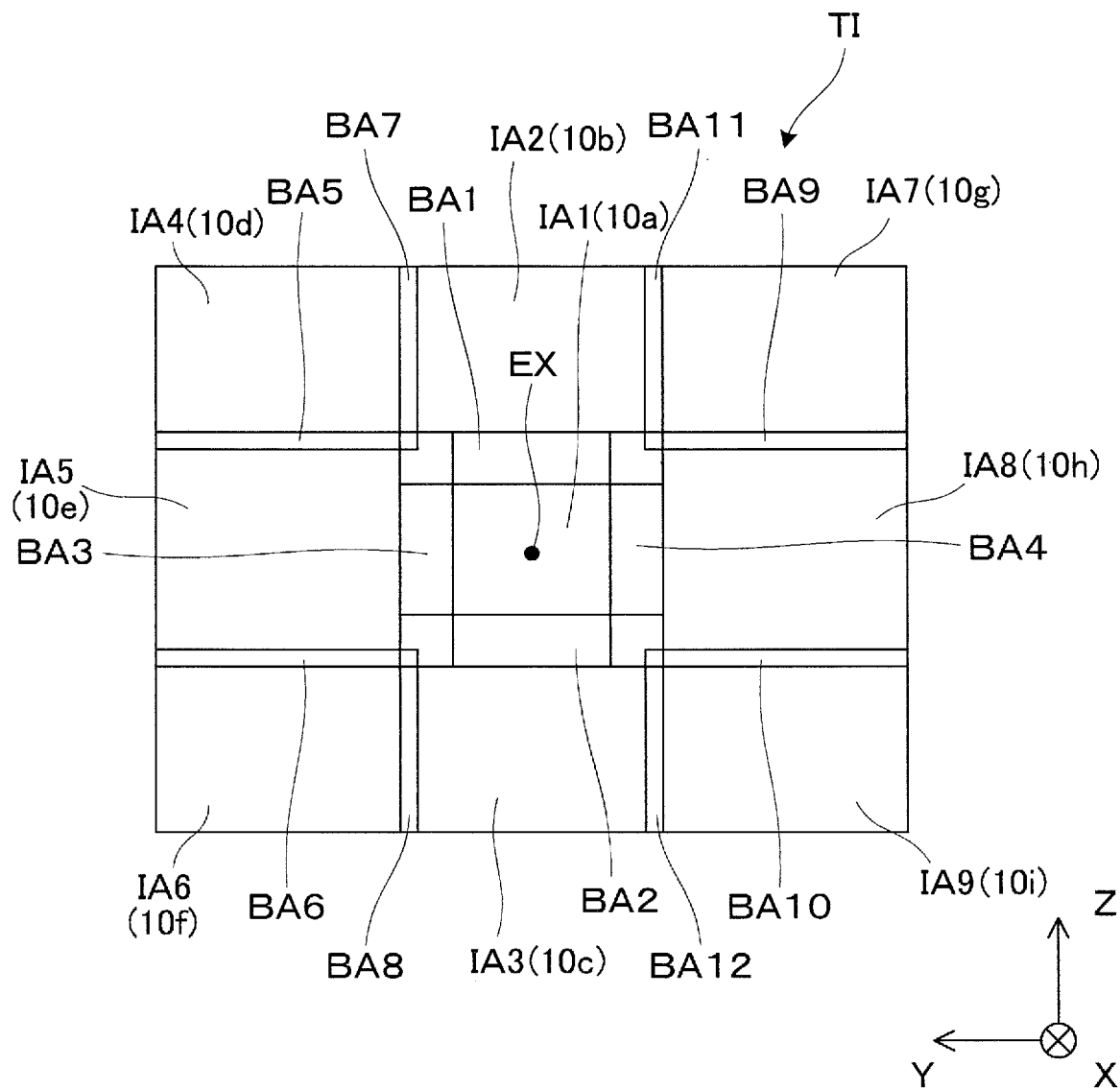
FIG. 18 is an explanatory side cross-sectional view illustrating an image display device according to Third Exemplary Embodiment.

FIG. 18 is an explanatory view illustrating setting of a blending area in the ocular optical system of Third Exemplary Embodiment. In this case, an ocular optical system 100A includes first to ninth optical system parts 10a to 10i, and an image region TI includes partial regions IA1 to IA9 aligned in a 3×3 matrix. Of blending areas BA1 to BA12 formed between the partial regions IA1 to IA9, the blending areas BA1 to BA4 closer to the center side through which a visual axis EX passes each have a width smaller than a width of each of the blending areas BA5 to BA12 located on the outer sides of the blending areas BA1 to BA4.

Fourth Exemplary Embodiment

An ocular optical system and the like according to Fourth Exemplary Embodiment will be described hereinafter. The ocular optical system according to this Exemplary Embodiment is a modification of the ocular optical system of First Exemplary Embodiment, and the same parts as in First Exemplary Embodiment will not be described.

Figure 19:
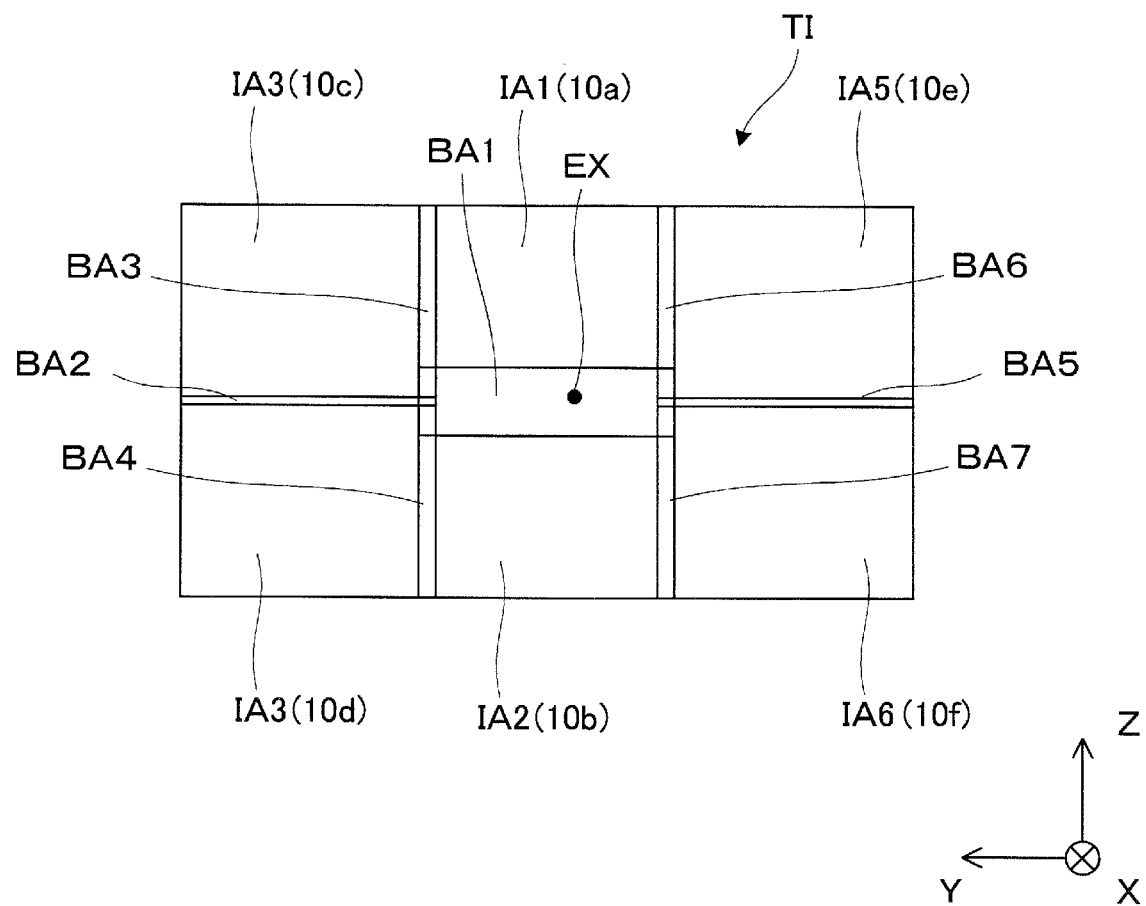
FIG. 19 is an explanatory side cross-sectional view illustrating an image display device according to Fourth Exemplary Embodiment.

FIG. 19 is an explanatory view illustrating setting of a blending area in the ocular optical system of Fourth Exemplary Embodiment. In this case, an ocular optical system 100A includes first to sixth optical system parts 10a to 10f, and an image region TI includes partial regions IA1 to IA6 aligned in a 2×3 matrix. Of blending areas BA1 to BA7, the blending area BA1 closer to the center side through which a visual axis EX passes has a width larger than a width of each of the blending areas BA2 to BA7 located on the outer side of the blending area BA1.

Fifth Exemplary Embodiment

An ocular optical system and the like according to Fifth Exemplary Embodiment will be described hereinafter. The ocular optical system according to this Exemplary Embodiment is a modification of the ocular optical system of First Exemplary Embodiment, and the same parts as in First Exemplary Embodiment will not be described.

Figure 20:
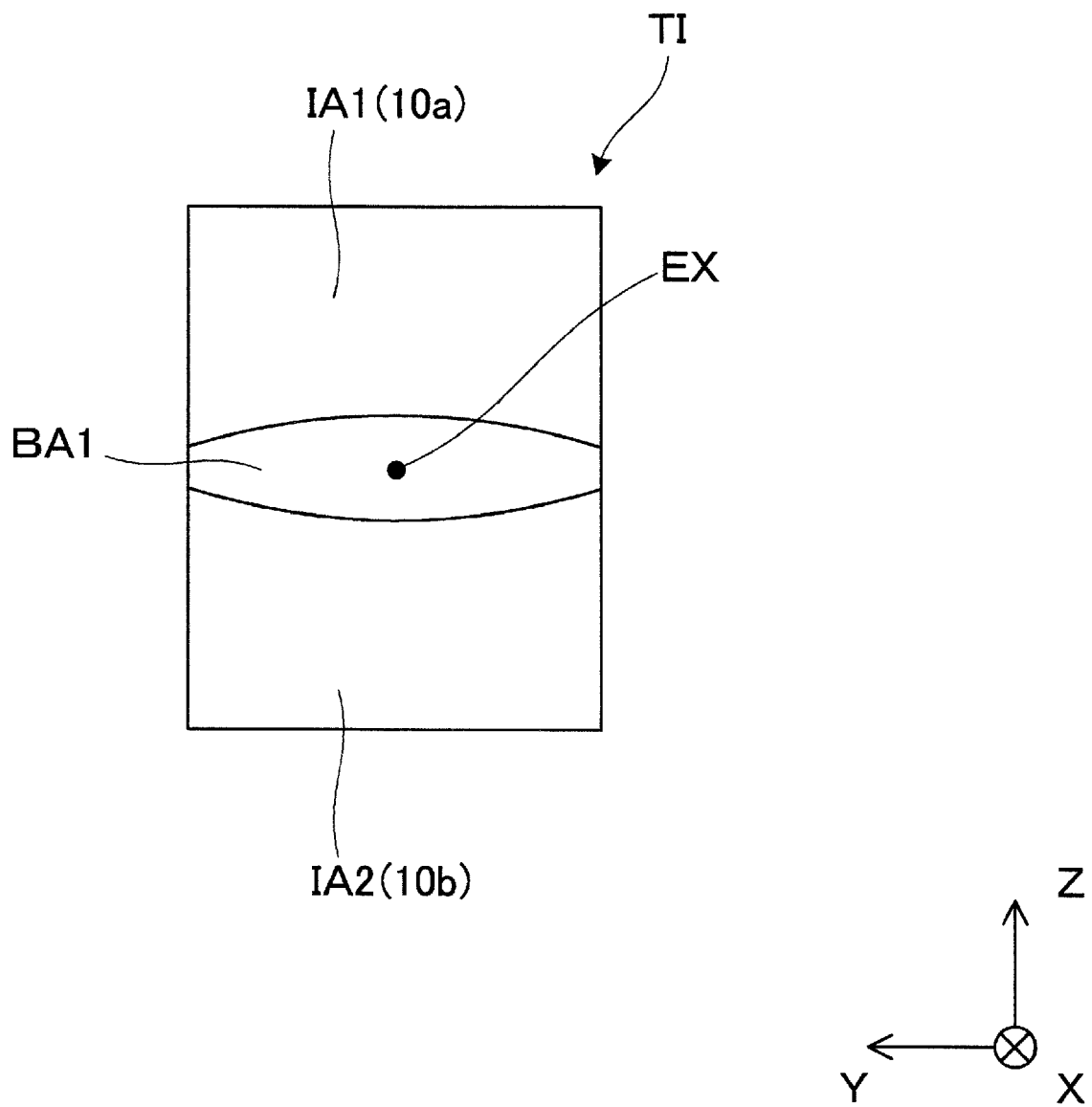
FIG. 20 is an explanatory side cross-sectional view illustrating an image display device according to Fifth Exemplary Embodiment.

FIG. 20 is an explanatory view illustrating setting of a blending area in the ocular optical system of Fifth Exemplary Embodiment. In this case, an ocular optical system 100A includes first and second optical system parts 10a and 10b, and an image region TI includes partial regions IA1 and IA2. A part of the blending area BA1 closer to the center through which a visual axis EX passes has a large width, and a part of the blending area BA1 distant from the center has a small width.

Other Modifications and the Like

Although the invention is described above according to the Exemplary Embodiments, the invention is not limited to the above-described Exemplary Embodiments, and can be carried out in many aspects without departing from the scope of the invention. For example, the following modifications can also be made.

In the above description, the image display device 200 includes the pair of image display units 200A and 200B, corresponding to the right and left eyes. However, the image display device 200 may be configured to include an image display unit for any one of the right eye and the left eye, and an image may be viewed by one eye.

In the above description, it is assumed that external light is not observed directly. However, a half-mirror or the like can be incorporated to enable external light to be observed in a see-through manner.

The entire disclosure of Japanese Patent Application No. 2017-201615, filed Oct. 18, 2017 is expressly incorporated by reference herein.

What is claimed is:

1. An image display device comprising:
a plurality of display elements configured to emit image light corresponding to a plurality of separate areas; and
an ocular optical system configured to emit, to a position corresponding to an eye of an observer, the image light emitted from the plurality of display elements, wherein
the ocular optical system causes images to overlap with each other in a blending area including a boundary between the plurality of areas,
an overlapping angle width in a direction orthogonal to the boundary of the blending area on a central visual field side is larger than an overlapping angle width in the direction orthogonal to the boundary of the blending area on a peripheral visual field side, and
the central visual field side is closer to a visual axis EX of a user's eye than the peripheral visual field side is.

2. The image display device according to claim 1, wherein
the blending area includes a blending area on the central visual field side and a blending area on the peripheral visual field side, and
an overlapping angle width of the blending area on the central visual field side is larger than an overlapping angle width of the blending area on the peripheral visual field side.

3. The image display device according to claim 1, wherein the ocular optical system includes a plurality of optical system parts.

4. The image display device according to claim 3, wherein
an angle of an optical axis of each of the plurality of optical system parts relative to a visual axis as looking forward is smaller than half a half viewing angle of the ocular optical system.

5. The image display device according to claim 4, wherein an angle $\theta$ in a prescribed direction relative to the visual axis of the optical axis of each of the plurality of optical system parts is in the range given by Relationship (1), where $\alpha$ represents a viewing angle in the prescribed direction of each of the optical system parts constituting the ocular optical system:

$$0 < \{(\alpha/2 - \theta)/\alpha\} < 0.4 \quad (1).$$

6. The image display device according to claim 1, wherein the blending area extends linearly along the boundary between the plurality of areas.

7. The image display device according to claim 1, wherein the blending area is disposed at a position shifted from the visual axis as looking forward.

8. The image display device according to claim 1, wherein the plurality of areas are aligned in a lateral direction along which eyes are arranged, and are aligned in a vertical direction orthogonal to the lateral direction along which the eyes are arranged.

9. The image display device according to claim 8, wherein an overlapping angle width in the lateral direction of a blending area extending in the vertical direction is smaller than an overlapping angle width in the vertical direction of a blending area extending in the lateral direction.

10. The image display device according to claim 1, further comprising:
a control circuit unit configured to carry out correction processing reflecting image forming properties of the ocular optical system on display in the blending area by the plurality of display elements.

11. The image display device according to claim 1, wherein
the control circuit unit receives setting from a user for the correction processing on the display in the blending area.

12. The image display device according to claim 1, wherein
the display elements include any of an organic EL display device, a liquid-crystal display device, and a laser scanning display device.

* * * * *